(12) United States Patent
Park et al.

(10) Patent No.: US 12,175,041 B2
(45) Date of Patent: Dec. 24, 2024

(54) DISPLAY DEVICE WITH FRAME FREQUENCY SYNCHRONIZATION

(71) Applicant: SAMSUNG DISPLAY CO., LTD., Yongin-si (KR)

(72) Inventors: Sang Hun Park, Cheonan-si (KR); Ji Hoon Kim, Suwon-si (KR); Yong Sub So, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/812,561

(22) Filed: Jul. 14, 2022

(65) Prior Publication Data

US 2023/0147349 A1 May 11, 2023

(30) Foreign Application Priority Data

Nov. 8, 2021 (KR) ........................ 10-2021-0152175

(51) Int. Cl.
*G06F 3/041* (2006.01)
*G09G 5/12* (2006.01)

(52) U.S. Cl.
CPC ...... *G06F 3/04184* (2019.05); *G06F 3/04166* (2019.05); *G09G 5/12* (2013.01)

(58) Field of Classification Search
CPC .... G06F 3/04184; G06F 3/04166; G09G 5/12
See application file for complete search history.

(56) References Cited

U.S. PATENT DOCUMENTS

| | | | |
|---|---|---|---|
| 10,073,562 B2 * | 9/2018 | Mo | G02F 1/13439 |
| 10,528,158 B2 * | 1/2020 | Huang | G06F 3/0442 |
| 2016/0092027 A1 * | 3/2016 | Lee | G06F 3/0412 |
| | | | 345/174 |
| 2017/0300165 A1 * | 10/2017 | Shin | G06F 3/04184 |
| 2017/0315659 A1 * | 11/2017 | Kuroiwa | G09G 3/3648 |
| 2018/0173367 A1 * | 6/2018 | Mayumi | G06F 3/0412 |
| 2019/0384475 A1 * | 12/2019 | Kim | G06F 3/044 |
| 2021/0132719 A1 | 5/2021 | Park et al. | |
| 2021/0149540 A1 * | 5/2021 | Shikata | G09G 3/20 |
| 2021/0389864 A1 * | 12/2021 | Jiang | G06F 3/04182 |

FOREIGN PATENT DOCUMENTS

| | | |
|---|---|---|
| KR | 10-1016675 | 2/2011 |
| KR | 10-1992879 | 6/2019 |

* cited by examiner

*Primary Examiner* — Bryan Earles
(74) *Attorney, Agent, or Firm* — F. CHAU & ASSOCIATES, LLC

(57) ABSTRACT

A display device is provided. The display device includes a display unit, a touch unit, a display driver configured to drive the display unit and including a synchronization signal generator, and a touch driver configured to drive the touch unit and including a synchronization signal receiver and a touch signal adjuster, wherein the synchronization signal generator is configured to generate a first synchronization signal supporting a frequency of a display signal applied to the display unit based on input frame frequency information and a second synchronization signal supporting the frequency of the display signal and including the frame frequency information, based on the frame frequency information and the first synchronization signal, and wherein the synchronization signal receiver is configured to receive the horizontal synchronization signal.

18 Claims, 18 Drawing Sheets

DISPLAY DEVICE WITH FRAME FREQUENCY SYNCHRONIZATION

CROSS-REFERENCE TO RELATED APPLICATION

This application claims priority under 35 U.S.C. § 119 to Korean Patent Application No. 10-2021-0152175 filed on Nov. 8, 2021 in the Korean Intellectual Property Office, the disclosure of which is incorporated by reference herein in its entirety.

TECHNICAL FIELD

The present disclosure relates to a display device. More particularly, the present disclosure relates to a display device with frame frequency synchronization.

DISCUSSION OF THE RELATED ART

Display devices are used to facilitate the transfer of information to users. For example, display devices have been employed in various electronic devices such as smartphones, digital cameras, laptop computers, navigation devices, and smart televisions. Recently, several types of flat panel display devices have been developed, such as liquid crystal display devices, field emission display devices, or organic light emitting display devices. A light emitting display device may display an image without a separate backlight unit providing light to a display panel, as each of the pixels of the display panel includes a light emitting element that may emit light by itself.

Some display devices may further include a touch driver for recognizing a touch input. The touch driver determines whether or not a user has touched the screen, and calculates a corresponding position as coordinates of the touch input. When a display unit (DU) and the touch driver are simultaneously driven, display noise may be generated due to a disturbance in a coupled signal of the display unit DU and the touch driver.

SUMMARY

Aspects of the disclosure provide a display device capable of recognizing a frame frequency by a touch driver when the frame frequency at which a display driver controls a display panel varies.

Aspects of the disclosure also provide a display device capable of minimizing an effect of noise on a touch driving signal originating from a display panel and of preventing unnecessary power consumption while maintaining performance of a touch panel, when a frame frequency varies.

However, aspects of the disclosure are not restricted to those set forth herein. The above and other aspects of the disclosure will become more apparent to one of ordinary skill in the art to which the disclosure pertains by referencing the detailed description of the disclosure given below.

According to an embodiment of the disclosure, a display device includes a display unit, a touch unit, a display driver configured to drive the display unit and including a synchronization signal generator, and a touch driver configured to drive the touch unit and including a synchronization signal receiver and a touch signal adjuster, wherein the synchronization signal generator is configured to generate a vertical synchronization signal supporting a frequency of a display signal applied to the display unit based on input frame frequency information and a horizontal synchronization signal supporting the frequency of the display signal and including the frame frequency information based on the frame frequency information and the vertical synchronization signal, and wherein the synchronization signal receiver is configured to receive the horizontal synchronization signal.

In an embodiment, the vertical synchronization signal may include a synchronization signal section having a first signal waveform and a porch section having a second signal waveform different from the first signal waveform, the horizontal synchronization signal includes a first section corresponding to the synchronization signal section and a second section corresponding to the porch section, and the first section includes the first signal waveform, and the second section includes a third signal waveform different from the first signal waveform and the second signal waveform, and includes the frame frequency information.

In an embodiment, the third signal waveform may reflect (e.g., include) the frame frequency information in the form of a duty value, wherein the duty value is mapped to the frequency of the display signal in a lookup table.

In an embodiment, the display driver may further include a memory storing a value of a first pulse width according to the frame frequency information, the memory may further store the lookup table, and the third signal waveform includes a first pulse that rises at the same time as the start of the porch section, is maintained by the first pulse width, and then falls.

In an embodiment, the first pulse width of the first pulse may be 4 to 100 times the width of a pulse width of a unit clock of a clock signal applied to the display driver.

In an embodiment, the synchronization signal generator may include a clock generator configured to receive a clock control signal, to generate the third signal waveform, and to output the clock signal corresponding to a frame frequency.

In an embodiment, the synchronization signal generator may include a clock generator configured to receive a voltage control signal, to generate the third signal waveform, and to output the voltage signal.

In an embodiment, the touch signal adjuster may be configured to receive the frame frequency information included in the horizontal synchronization signal from the synchronization signal receiver and to modulate a touch driving signal based on the frame frequency information.

In an embodiment, the touch driver further may include a voltage generator which varies an amplitude of the touch driving signal according to the frame frequency information.

In an embodiment, the modulated touch driving signal may include an effective touch driving section having a first amplitude and a noise touch driving section having a second amplitude different from the first amplitude.

In an embodiment, the synchronization signal receiver may be configured to further receive the vertical synchronization signal.

In an embodiment, the display unit and the touch unit may be provided in a single panel, and the display driver and the touch driver may be included in a driving chip connected to the single panel.

In an embodiment, the synchronization signal generator includes a first output terminal outputting the vertical synchronization signal and a second output terminal for outputting the second synchronization signal, the touch driver includes a first input terminal and a second input terminal, and a first synchronization signal information line connects the first output terminal to the first input terminal, a second synchronization signal information line connects the second output terminal to the second input terminal, and wherein the first synchronization signal information line and the second synchronization signal information line are each disposed between the synchronization signal generator and the touch driver.

According to another embodiment of the disclosure, a display device comprise a display unit, a touch unit disposed to overlap the display unit, a display driver configured to drive the display unit and including a synchronization signal generator, and a touch driver configured to drive the touch unit and including a synchronization signal receiver and a touch signal adjuster, wherein the synchronization signal generator is configured to generate a vertical synchronization signal supporting a frequency of a display signal applied to the display unit based on input frame frequency information and a horizontal synchronization signal supporting the frequency of the display signal and including the frame frequency information, wherein the horizontal synchronization signal is based on the frame frequency information and the vertical synchronization signal, and wherein the synchronization signal receiver is configured to receive the horizontal synchronization signal.

In an embodiment, the vertical synchronization signal may include a synchronization signal section having a first signal waveform and a porch section having a second signal waveform, the horizontal synchronization signal includes a first section corresponding to the synchronization signal section and a second section corresponding to the porch section, and the first section includes the first signal waveform, and the second section includes a third signal waveform different from the first signal waveform and the second signal waveform, and includes the frame frequency information in the form of a duty value, wherein the duty value is mapped to the frequency of the display signal in a lookup table.

In an embodiment, the third signal waveform may include a first pulse that rises at the same time as the start of the porch section, is maintained by a first pulse width, and then falls.

In an embodiment, the touch signal adjuster may be configured to receive the frame frequency information included in the horizontal synchronization signal from the synchronization signal receiver and to modulate a touch driving signal based on the frame frequency information.

In an embodiment, the modulated touch driving signal may include an effective touch driving section having a first amplitude and a noise touch driving section having a second amplitude different from the first amplitude.

In an embodiment, the synchronization signal receiver may be configured to further receive the vertical synchronization signal.

In an embodiment, the display unit and the touch unit may be provided in a single panel, and the display driver and the touch driver are included in a driving chip connected to the single panel.

With the display device according to an embodiment, even though a frame frequency at which the display driver controls a display panel varies, an influence of noise from the display signals on touch driving signals acting from the display panel may be minimized.

Further, in some embodiments, the touch driving signals applied to a touch panel are changed according to a change in the frame frequency of the display device, and thus, unnecessary power consumption may be prevented while maintaining performance of the touch panel. In addition, distortion of the touch driving signals due to data signals may be decreased, and distortion of an image quality may be minimized while maintaining reliability of touch sensitivity.

The effects of the disclosure are not limited to the aforementioned effects, and persons of ordinary skill in the art will recognize various other effects from the specification.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
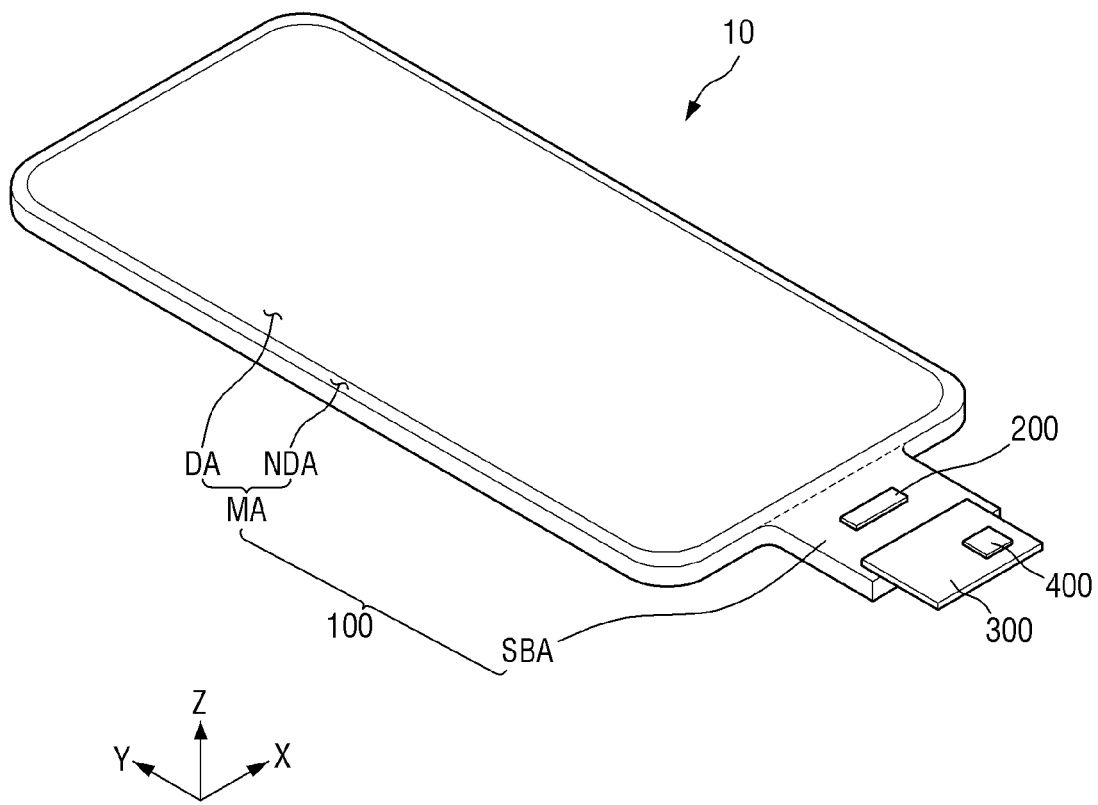
FIG. 1 is a schematic plan view of a display device according to an embodiment.

Embodiments of the inventive concept will now be described more fully hereinafter with reference to the accompanying drawings. The present disclosure may, however, be embodied in different forms and should not be construed as limited to the embodiments set forth herein. Rather, these embodiments are provided so that this disclosure will be thorough and complete, and will filly convey the scope of the inventive concept to those skilled in the art. Throughout the specification, like reference symbols in the drawings may denote like elements, and to the extent that a description of an element has been omitted, it may be understood that the element is at least similar to corresponding elements that are described elsewhere in the specification.

It will be understood that when a layer is referred to as being "on" another layer or substrate, it can be directly on the other layer or substrate, or intervening layers may also be present.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present inventive concepts. Similarly, the second element could also be termed the first element.

Hereinafter, example embodiments will be described with reference to the accompanying drawings.

Figure 2:
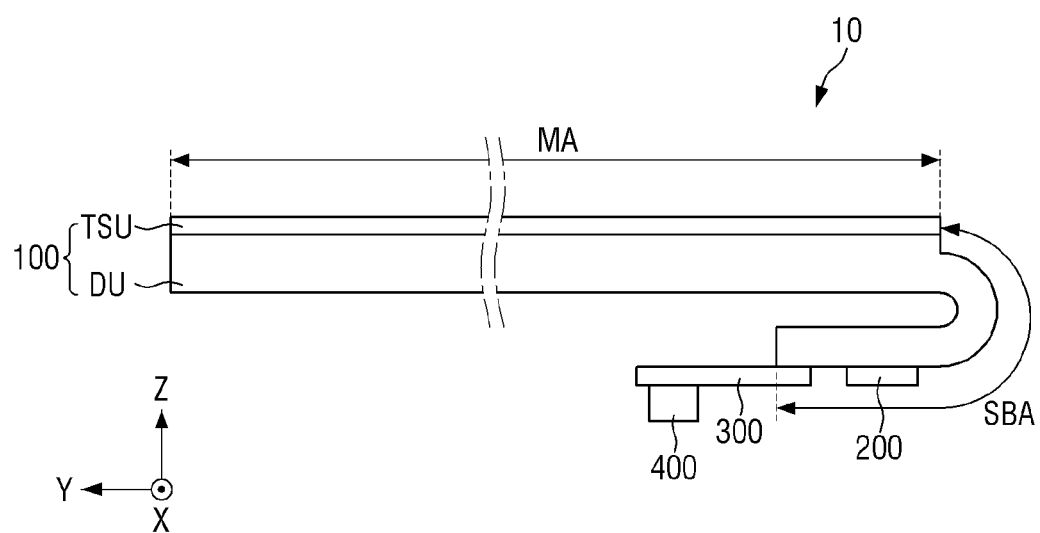
FIG. 2 is a schematic cross-sectional view of the display device according to an embodiment.

FIG. 1 is a schematic plan view of a display device according to an embodiment. FIG. 2 is a schematic cross-sectional view of the display device according to an embodiment.

In the drawings, a first direction X is parallel to one side of a display device 10 in plan view, and refers to a short side direction of the display device 10. A second direction Y is a direction parallel to the long side of the display device 10 in plan view, and refers to a long side direction of the display device 10. A third direction Z refers to a thickness direction of the display device 10. However, it should be understood that directions mentioned in embodiments refer to relative directions, and various embodiments and their orientations are not limited to the mentioned directions.

The display device 10 may be or be used in various electronic devices that provide display screens. For example, the display device 10 may be applied to portable electronic devices such as mobile phones, smartphones, tablet personal computers (PCs), mobile communication terminals, electronic notebooks, electronic books, portable multimedia players (PMPs), navigation devices, and ultra mobile PCs (UMPCs). For example, the display device 10 may be applied as a display unit DU of televisions, laptop computers, monitors, billboards, or the Internet of Things (IOTs). In addition, the display device 10 may be applied to wearable devices such as smart watches, watch phones, glasses-type displays, and head mounted displays (HMDs).

Referring to FIG. 1, the display device 10 may have a shape similar to a rectangular shape, in plan view. For example, the display device 10 may have a shape similar to a rectangular shape, in plan view, with short sides extending in the first direction X and long sides extending in the second direction Y. A corner where the short side in the first direction X and the long side in the second direction Y meet may be rounded with a predetermined curvature, or be right-angled. The shape of the display device 10 in plan view is not necessarily limited to the rectangular shape, and may be another polygonal shape, an irregular shape, a circular shape, or an elliptical shape.

A front surface and/or a rear surface of the display device 10 may be a display surface. In this embodiment, the "front surface" is a surface positioned on one side of one plane, and refers to a surface positioned on one side in the third direction Z in the drawings (e.g., toward a positive Z direction), and the "rear surface" is a surface positioned on the other side of one plane, and refers to a surface positioned on the other side in the third direction Z in the drawings. In some embodiments, the display device 10 is a double-sided display device 10 which displays images on both the front surface and the rear surface, but an embodiment in which the display surface is positioned on the front surface of the display device 10 will hereinafter be mainly described.

The display device 10 includes a display panel 100 providing a display screen, a display driver 200, a circuit board 300, and a touch driver 400.

The display panel 100 may have a shape similar to a rectangular shape in plan view. For example, the display panel 100 may have a shape similar to a rectangular shape, in plan view, with short sides extending in the first direction X and long sides extending in the second direction Y. A corner where the short side in the first direction X and the long side in the second direction Y meet may be rounded with a predetermined curvature, or be right-angled. The shape of the display panel 100 in plan view is not necessarily limited to the rectangular shape, and may be another polygonal shape, an irregular shape, a circular shape, or an elliptical shape. In addition, the display panel 100 may also be formed flexibly so as to be bent without damage.

The display panel 100 may include a main area MA and a sub-area SBA.

The main area MA may include a display area DA including pixels configured to display an image and a non-display area NDA disposed around the display area DA. The display area DA may emit light from a plurality of emission areas or a plurality of opening areas. For example, the display panel 100 may include pixel circuits including switching elements, a pixel defining film defining the emission areas or opening areas, and self-light emitting elements.

The non-display area NDA may be disposed outside the display area DA. The non-display area NDA may be defined as an edge area of the main area MA of the display panel 100. The non-display area NDA may include a gate driver configured to supply gate signals to gate lines.

The sub-area SBA may extend from one side of the main area MA. The sub-area SBA may be bent to wrap around and overlap the main area MA in the third direction Z. The sub-area SBA may include the display driver 200 and a pad part connected to the circuit board 300.

Referring to FIG. 2, the display panel 100 includes a display unit DU and a touch unit TSU.

Figure 4:
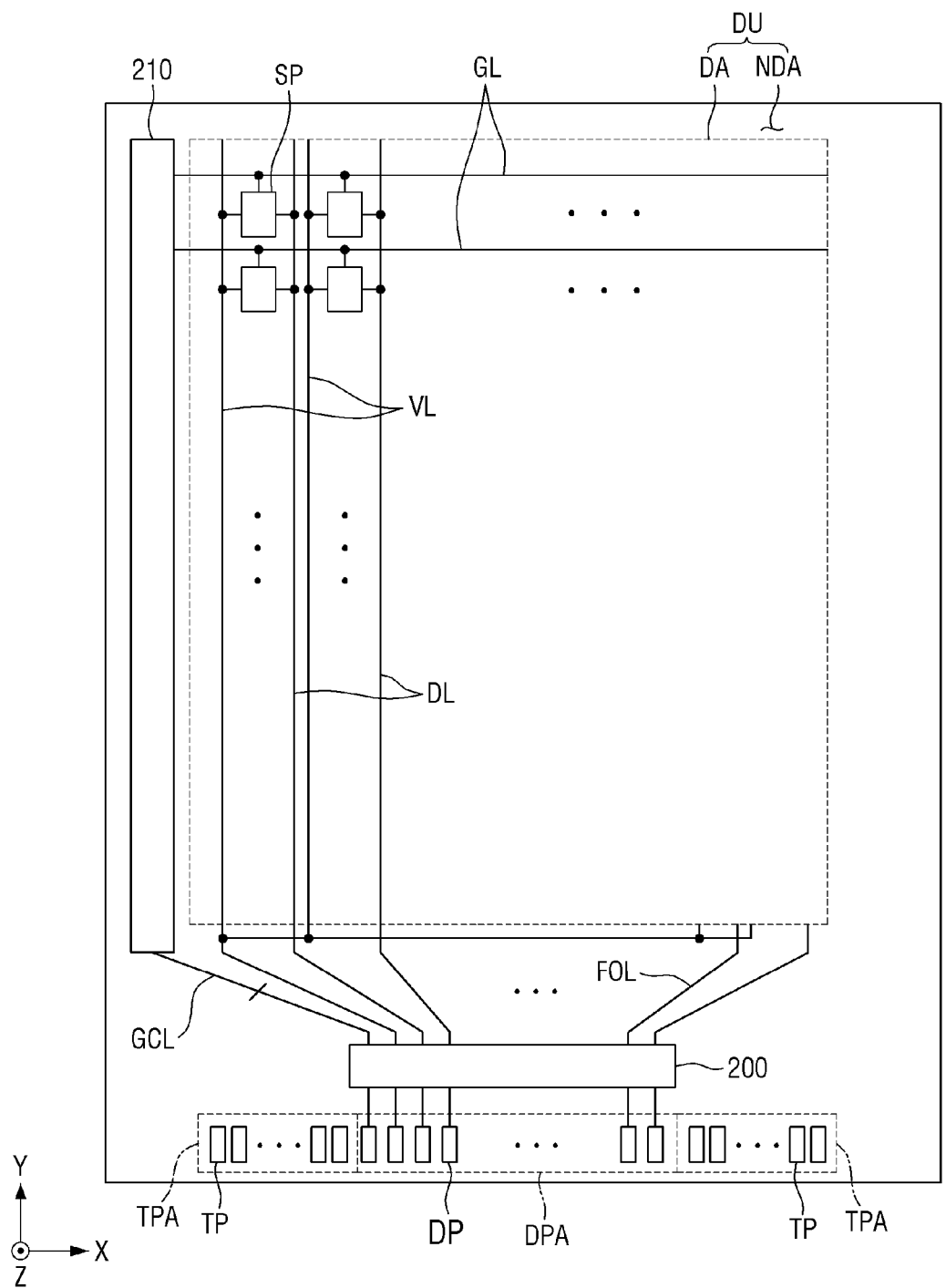
FIG. 4 is a schematic plan view that illustrates the display unit of the display device according to an embodiment.

The display unit DU may include a plurality of pixels SP (see FIG. 4). The pixel SP is a basic unit for displaying a screen (e.g., a color on a screen). The pixel SP may include a red pixel, a green pixel, and a blue pixel, but is not necessarily limited thereto. The plurality of pixels SP may be alternately arranged in plan view. For example, the pixels SP may be arranged in a matrix direction, but are not necessarily limited thereto.

The touch unit TSU may be disposed on the display unit DU. The touch unit TSU includes a plurality of touch electrodes RE and TE (FIG. 5) for sensing a user's touch in a capacitive manner, a plurality of touch driving lines TL connecting a plurality of driving electrodes TE and the touch driver 400 to each other, and a plurality of touch sensing lines RL. The touch unit TSU is a layer configured to sense a touch input and may function as a touch member. The touch unit TSU may determine whether or not the touch input has been generated, and may calculate a corresponding position of the touch input as touch input coordinates. A detailed description of the display unit DU and the touch unit TSU will be described later with reference to FIGS. 4 to 7.

The display unit DU and the touch unit TSU may overlap each other. For example, the display area DA may be an area in which both of the display of images and the sensing of the touch input are performed. The plurality of driving electrodes TE of the touch unit TSU may be disposed in a touch sensor area overlapping the display area DA.

The sub-area SBA of the display panel 100 may extend from one side of the main area MA. The sub-area SBA may include a flexible material may be bent, folded, and rolled. For example, when the sub-area SBA is bent, the sub-area SBA may overlap the main area MA in the third direction (Z-axis direction), as shown in FIG. 2. The sub-area SBA may include the display driver 200 and the pad part (DP in FIG. 4) connected to the circuit board 300.

Referring to FIG. 1 again, the display driver 200 may be disposed in the non-display area NDA of the display panel 100. In addition, the display driver 200 may be formed as an integrated circuit (IC) and be mounted on the display panel 100 in a chip on plastic (COP) manner or a chip on glass (COG) manner. The present disclosure is not necessarily limited thereto, however, and the display driver 200 may be mounted in various ways.

The display driver 200 may output data signals and voltages for driving the display panel 100. The display driver 200 may supply data voltages to data lines. The display driver 200 may supply a source voltage to a power line and supply gate control signals to the gate driver.

The circuit board 300 may be disposed in the non-display area NDA of the display panel 100. Lead lines of the circuit board 300 may be electrically connected to the pad part (DP, FIG. 4) of the display panel 100. The circuit board 300 may be a flexible film such as a flexible printed circuit board, a printed circuit board, or a chip on film.

The circuit board 300 may include a plurality of conductive lines for transferring signals from a main circuit board to the circuit board 300 and/or electrically connecting the touch driver 400 and a plurality of touch electrodes RE and TE of a touch layer to each other.

The touch driver 400 may be disposed in the non-display area NDA of the display panel 100. The touch driver 400 may be mounted on the circuit board 300. The touch driver 400 may supply touch driving signals TX to a plurality of touch electrodes of a touch panel and sense changes in capacitance between the plurality of touch electrodes.

The touch driver 400 may determine whether or not a touch input has been generated and calculate touch coordinates based on the sensed change in capacitance between the plurality of touch electrodes. The touch driver 400 may be formed as an integrated circuit (IC) and be mounted on the display panel 100 in a chip on plastic (COP) manner or a chip on glass (COG) manner. However, the present disclosure is not necessarily limited thereto, and the touch driver 400 may be mounted in various ways.

Figure 3:
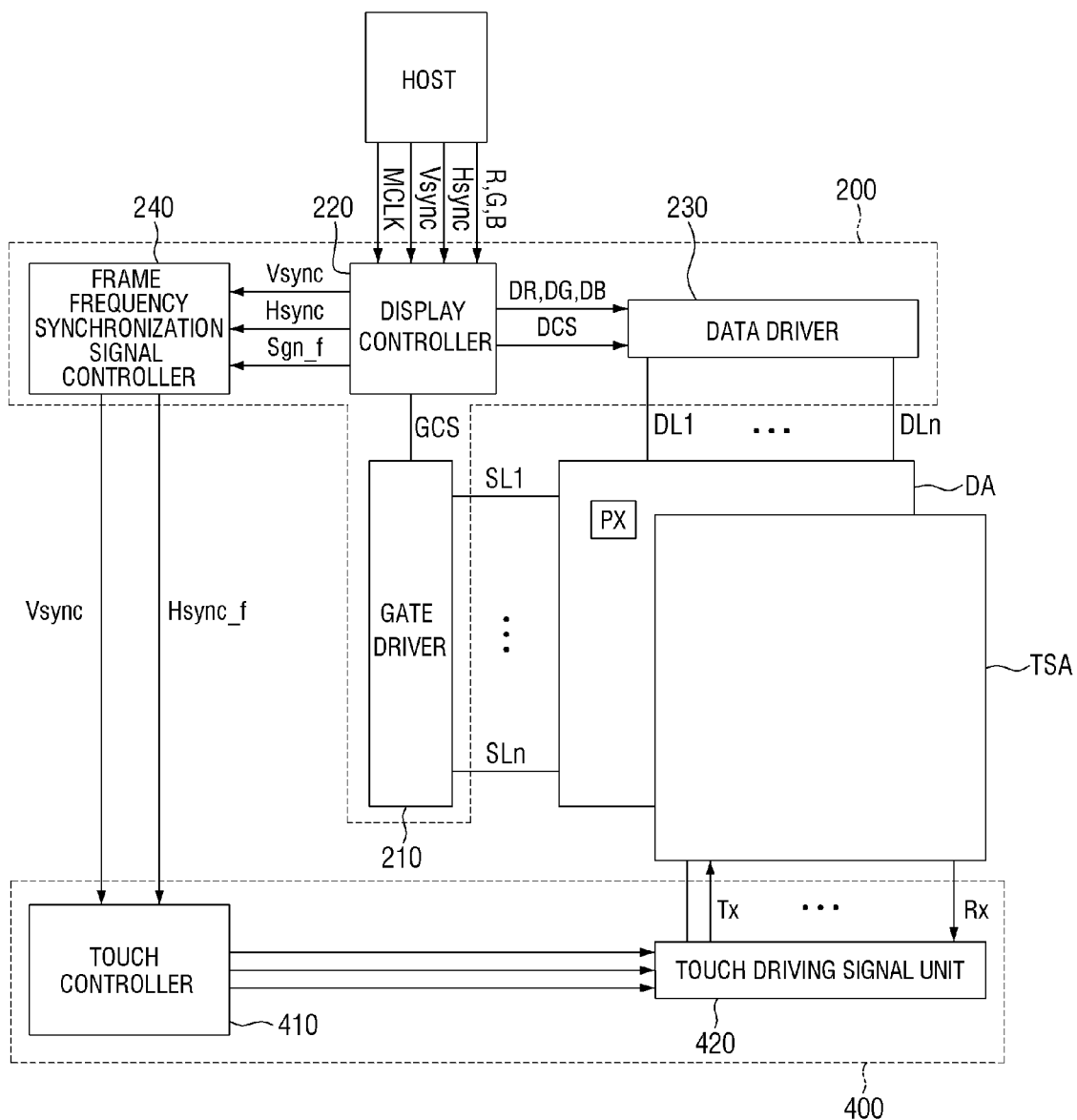
FIG. 3 is a block diagram that illustrates a display unit and a touch driver according to an embodiment.

FIG. 3 is a block diagram that illustrates a display unit and a touch driver according to an embodiment. FIG. 4 is a schematic plan view that illustrates the display unit of the display device according to an embodiment.

Referring to FIGS. 3 and 4, the display device 10 includes the display panel 100 including the plurality of pixels SP, the display driver 200, and the touch driver 400.

Referring to FIG. 3, the display driver 200 may include a gate driver 210, a data driver 230, a display controller 220, and a frame frequency synchronization signal controller 240.

The display controller 220 may receive input data R, G, and B, a vertical synchronization signal Vsync, a horizontal synchronization signal Hsync, and a frame frequency signal Sgn_f from outside of the display unit (e.g., a host). The input data R, G, and B may be RGB data including red image data, green image data, and blue image data. The display controller 220 may generate output data signals DR, DG, and DB and an internal control signal using the received data R, G, and B, vertical synchronization signal Vsync, horizontal synchronization signal Hsync, and frame frequency signal Sgn_f.

The internal control signal includes a data driver control signal DCS and a gate driver control signal GCS.

The display controller 220 may control operations of the data driver 230 by providing the data driver control signal DCS to the data driver 230, control operations of the gate driver 210 by providing the gate driver control signal GCS to the gate driver 210, and control operations of the frame frequency synchronization signal controller 240 by providing the vertical synchronization signal Vsync, the horizontal synchronization signal Hsync, and the frame frequency signal Sgn_f to the frame frequency synchronization signal controller 240.

The data driver 230 may receive the output data signals DR, DG, and DB and the data driver control signal DCS from the display controller 220. The data driver 230 may generate data signals using the received output data signals DR, DG, and DB and data driver control signal DCS, and provide the generated data signals to the display panel 100. The data driver 230 may provide the data signals through a plurality of data lines DL1 to DLn (see FIG. 3, FIG. 4) connected to the display panel 100.

The gate driver 210 may receive the gate driver control signal GCS from the display controller 220. The gate driver 210 may generate gate signals using the received gate driver control signal GCS and provide the generated gate signals to the display panel 100. The gate driver 210 may provide the gate signals through a plurality of gate lines GL1 to GLn (see FIG. 4) connected to the display panel 100. A detailed description of the plurality of data lines DL1 to DLn (see FIG. 3, FIG. 4) and the plurality of gate lines GL1 to GLn (see FIG. 4) will be described later with reference to FIG. 4.

The gate driver 210, the data driver 230, and the display controller 220 may be included in the display driver 200 which controls operations of the display panel 100. In some embodiments, the gate driver 210, the data driver 230, and the display controller 220 may be formed as integrated circuits (ICs) and be mounted on the display driver 200.

The display panel 100 may receive the data signals from the data driver 230 and receive the gate signals from the gate driver 210. The display panel 100 may include the plurality of pixels SP (see FIG. 3) connected to the plurality of data lines DL1 to DLn (see FIG. 3, FIG. 4)) and to the plurality of gate lines GL1 to GLn (see FIG. 3, FIG. 4).

The frame frequency synchronization signal controller 240 may receive the vertical synchronization signal Vsync, the horizontal synchronization signal Hsync, and the frame frequency signal Sgn_f from the display controller 220.

The frame frequency synchronization signal controller 240 may generate a frame frequency synchronization signal Hsync_f using the received vertical synchronization signal Vsync, horizontal synchronization signal Hsync, and frame frequency signal Sgn_f, and may provide the generated frame frequency synchronization signal Hsync_f to the touch driver 400. The frame frequency synchronization signal controller 240 may provide the frame frequency synchronization signal Hsync_f through a plurality of frame frequency synchronization signal lines connected to the touch driver 400.

The frame frequency synchronization signal controller 240 may be formed integrally with the display controller 220. For example, the frame frequency synchronization signal controller 240 may be formed in the same circuit and/or in the same package as the display controller 220. In some embodiments, the frame frequency synchronization signal controller 240 may be formed as an integrated circuit (IC) and be mounted on the display driver 200 and/or the display controller 220.

Meanwhile, a frame frequency input to the display driver 200 may vary. For example, the frame frequency may vary within the range of 1 Hz to 240 Hz according to, for example, a host's or user's selection. The display driver 200 may be driven at 60 Hz for one section and change the frame frequency to 120 Hz for another section according to the user's need.

Accordingly, the vertical synchronization signal Vsync, the horizontal synchronization signal Hsync, and the frame frequency signal Sgn_f received by the frame frequency synchronization signal controller 240 of the display driver 200 may also vary in order to change the frame frequency according to the host's or user's selection. The varying frame frequency signal Sgn_f corresponds to the frame frequency synchronization signal Hsync_f, which corresponds to a frame frequency stored in a memory, and accordingly, the frame frequency synchronization signal Hsync_f generated by the frame frequency synchronization signal controller 240 may also vary.

The touch driver 400 may receive the frame frequency synchronization signal Hsync_f from the frame frequency synchronization signal controller 240. The touch driver 400 may also receive the vertical synchronization signal Vsync through the plurality of frame frequency synchronization signal lines.

As described above, the touch unit TSU may be disposed on the display unit DU so as to overlap the display unit DU. Accordingly, when the spacing between the touch unit TSU and the display unit DU is small, electrical interactions may exist between the gate signals and the data signals of the display driver 200 and touch driving signals TX and touch sensing signals RX of the touch unit. Therefore, any one signal may serve as noise for another signal. For example, in the touch driving signals TX and the touch sensing signals RX, the gate signals and the data signals may cause display noise. The touch driver 400 may generate the touch driving signals TX so as to avoid such display noise. For example, even though the frame frequency varies, an influence of the noise on the touch driving signals TX from the display panel 100 may be minimized. A detailed description of the touch driver 400 will be described later with reference to FIG. 5.

Referring to FIG. 4, the display unit DU may include a display area DA and a non-display area NDA. The display unit DU may include the plurality of pixels SP and the plurality of gate lines GL1 to GLn and the plurality of data lines DL1 to DLn connected to the plurality of pixels SP.

The plurality of gate lines GL1 to GLn may supply the gate signals received from the gate driver 210 to the plurality of pixels SP. Each of the plurality of gate lines GL1 to GLn may extend in the first direction X, and may be spaced apart from each other in the second direction Y.

The plurality of data lines DL1 to DLn may supply the output data signals DR, DG, and DB and the data signals received from the display driver 200 to the plurality of pixels SP. The plurality of data lines DL1 to DLn may extend in the second direction Y, and may be spaced apart from each other in the first direction X.

The non-display area NDA may surround the display area DA. The non-display area NDA may include the gate driver 210 configured to supply the gate signals to the plurality of gate lines GL1 to GLn, fan-out lines FOL connecting the plurality of data lines DL1 to DLn and the display driver 200 to each other, and display pad parts DP connected to the circuit board 300.

The display driver 200 may supply the gate driver control signal GCS to the gate driver 210 through a gate control line GCL, as described above. The gate driver 210 may generate a plurality of gate signals based on the gate driver control signal GCS, and may sequentially supply the plurality of gate signals to the plurality of gate lines GL1 to GLn according to a set order.

In some embodiments, each of the plurality of pixels SP may receive a first source voltage and a second source voltage. The first source voltage may be a predetermined high level voltage, and the second source voltage may be a voltage lower than the first source voltage.

A display pad area DPA and a touch pad area TPA may be disposed at an edge of the display panel 100. The display pad area DPA may include a plurality of display pad parts DP. The plurality of display pad parts DP may be connected to a main processor through the circuit board 300. The plurality of display pad parts DP may be connected to the circuit board 300 and receive digital video data, and may supply the digital video data to the display driver 200.

Figure 5:
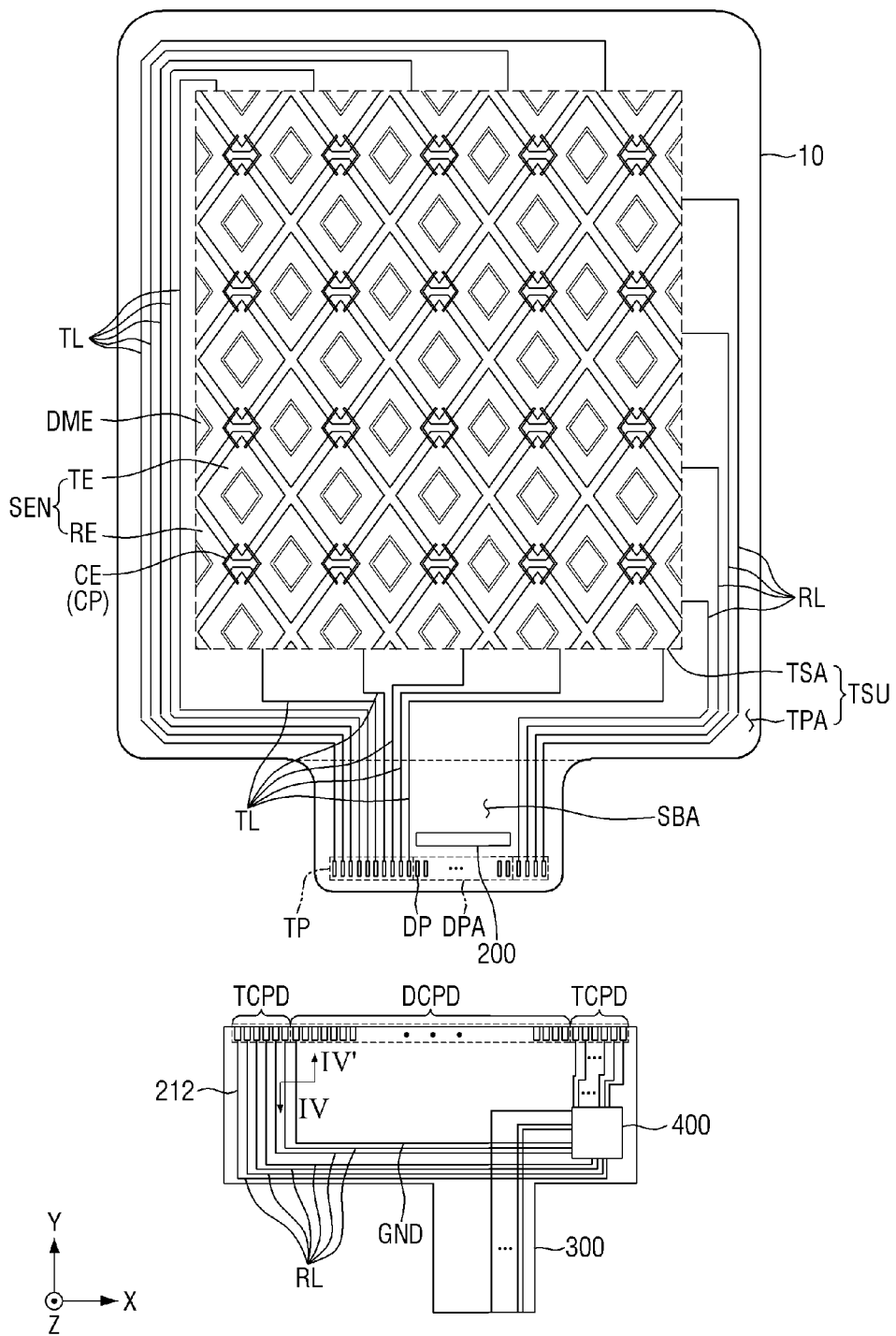
FIG. 5 is a plan view that illustrates a touch unit of the display device according to an embodiment.

FIG. 5 is a plan view that illustrates a touch unit of the display device according to an embodiment.

Referring to FIG. 5, the touch unit TSU may include a touch area TSA configured to sense a user's touch, and a touch peripheral area TPA disposed around the touch area TSA. The touch area TSA may overlap the display area DA of the display panel 100, and the touch peripheral area TPA may overlap the non-display area NDA of the display panel 100.

Referring to FIG. 5, the touch area TSA may include a plurality of touch electrodes RE and TE and a plurality of touch signal lines RL and TL. The touch area TSA may sense a touch input by receiving electrical signals from the touch driver 400 disposed on the circuit board 300 through the plurality of touch signal lines RL and TL and transmitting electrical signals sensed from the plurality of touch electrodes RE and TE to the touch driver 400 through the plurality of touch signal lines RL and TL.

A plurality of driving electrodes TE may be arranged in the first direction (X-axis direction) and the second direction (Y-axis direction). The plurality of driving electrodes TE may be spaced apart from each other in the first direction (X-axis direction) and the second direction (Y-axis direction). The driving electrodes TE adjacent to each other in the second direction (Y-axis direction) may be electrically connected to each other through a bridge electrode CE.

The plurality of driving electrodes TE disposed in the touch area TSA may be connected to the touch pad parts TP through the touch driving lines TL. A plurality of driving lines TL may pass through a lower side of the touch peripheral area TPA and/or may extend to the touch pad parts TP via an upper side, a left side, and a lower side of the touch peripheral area TPA. The touch pad parts TP may be connected to the touch driver 400 through the circuit board 300.

The display pad area DPA and the touch pad area TPA may be disposed at an edge of the sub-area SBA of the display panel 100. The display pad area DPA and the touch pad area TPA may be electrically connected to the circuit board 300 using a low-resistance and high-reliability material such as an anisotropic conductive film.

A plurality of sensing electrodes RE may extend in the first direction (X-axis direction) and may be spaced apart from each other in the second direction (Y-axis direction). The plurality of sensing electrodes RE may be arranged in the first direction (X-axis direction) and the second direction (Y-axis direction), and the plurality of sensing electrodes RE adjacent to each other in the first direction (X-axis direction) may be electrically connected to each other through a connection part (e.g., the connection structure CP as illustrated within the bridge electrode CE in FIG. 5).

The plurality of sensing electrodes RE may be connected to the touch pad parts TP through the plurality of touch sensing lines RL. For example, the plurality of sensing electrodes RE may be connected to the touch pad parts TP through the plurality of touch sensing lines RL disposed on the right side of the touch sensor area TSA. The plurality of touch sensing lines RL may extend to the touch pad parts TP via a right side and a lower side of the touch peripheral area TPA. The touch pad parts TP may be connected to the touch driver 400 through the circuit board 300.

The plurality of touch electrodes RE and TE may not cause display artifacts from a display layer by including a planar pattern formed of a transparent conductive layer or a mesh pattern in which an opaque metal is used along an area in which light emitting elements are not disposed.

The touch driving signal TX may be applied to each of the plurality of driving electrodes TE from the touch driver 400 through any one of the plurality of touch driving lines TL. The touch driver 400 may receive the frame frequency synchronization signal Hsync_f and output the touch driving signal TX corresponding to a duty value 720a (see FIG. 13). Thereafter, a mutual capacitance may be formed between the driving electrode TE and the sensing electrode RE adjacent to it. When a touch input is generated from the outside, a mutual capacitance value between the driving electrode TE and the sensing electrode RE adjacent to each other may change. The change in the mutual capacitance measured by the plurality of sensing electrodes RE may be transferred to the touch driver 400 through the plurality of touch sensing lines RL. Accordingly, the touch driver 400 may determine whether or not the touch input has been made, if it is determined a touch input has been made, calculate a corresponding position as touch input coordinates. The touch sensing may be performed in a mutual capacitive manner, but is not necessarily limited thereto.

Figure 6:
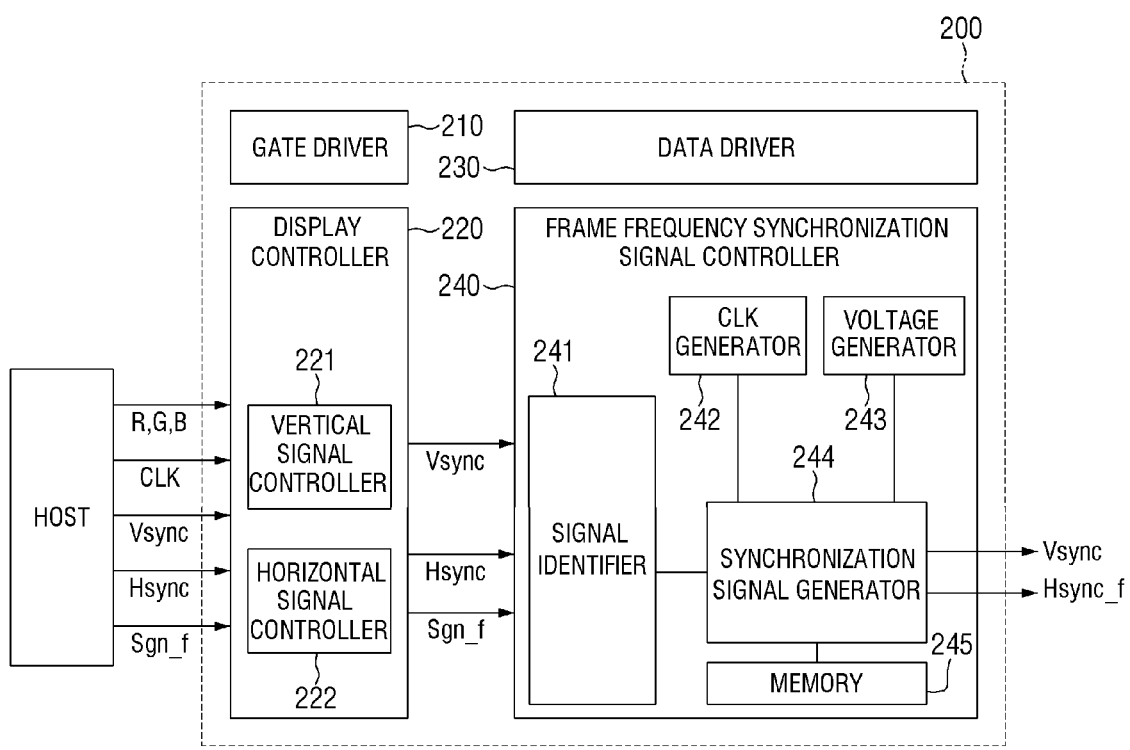
FIG. 6 is a detailed block diagram of a frame frequency synchronization signal controller according to an embodiment.

FIG. 6 is a detailed block diagram of a frame frequency synchronization signal controller according to an embodiment. The frame frequency synchronization signal controller 240 of the display driver 200 will be described with reference to FIG. 6.

Referring to FIG. 6, the frame frequency synchronization signal controller 240 may include a signal identifier 241, a clock generator 242, a voltage generator 243, a synchronization signal generator 244, and a memory 245.

Figure 12:
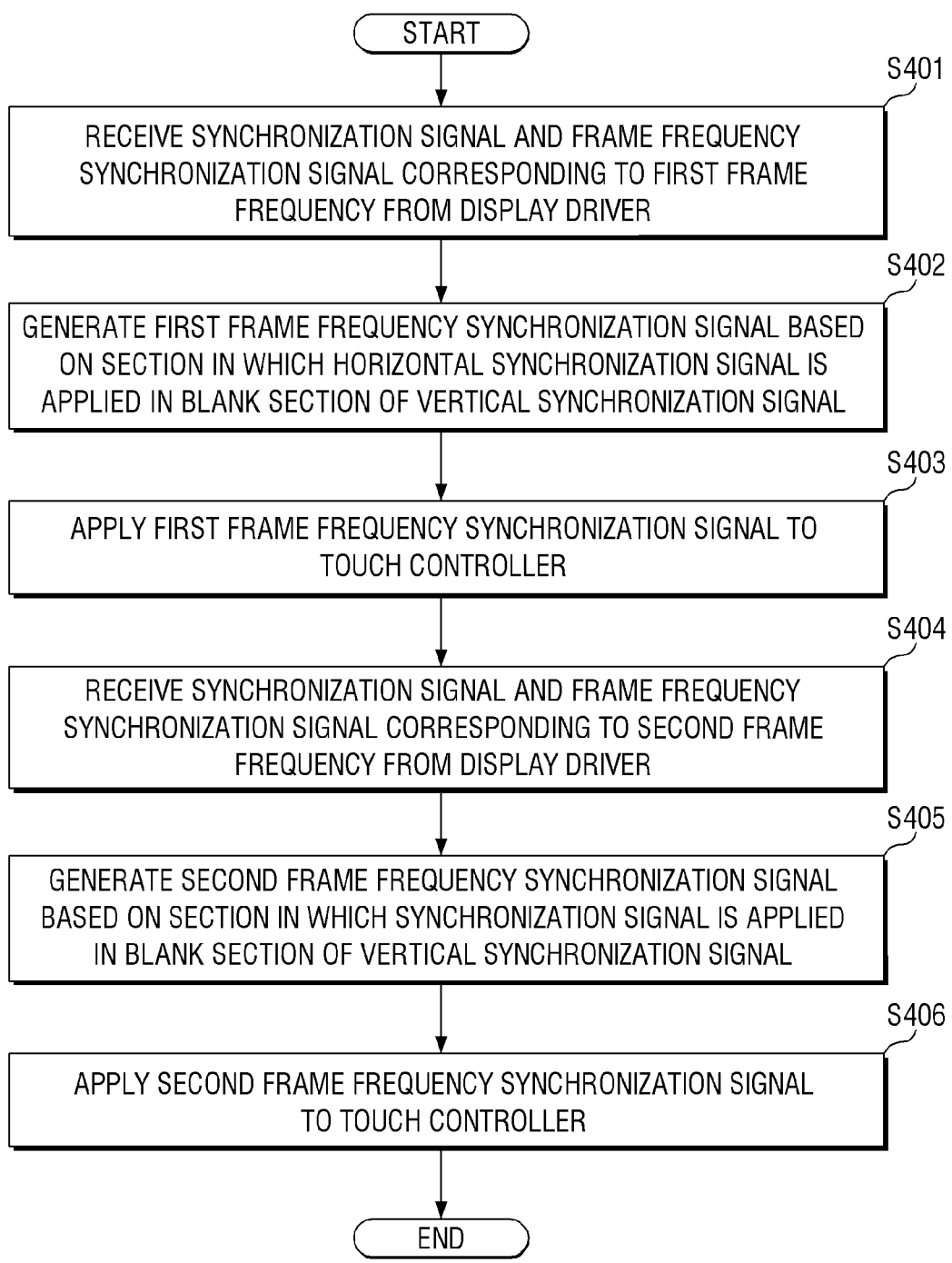
Figure 13:
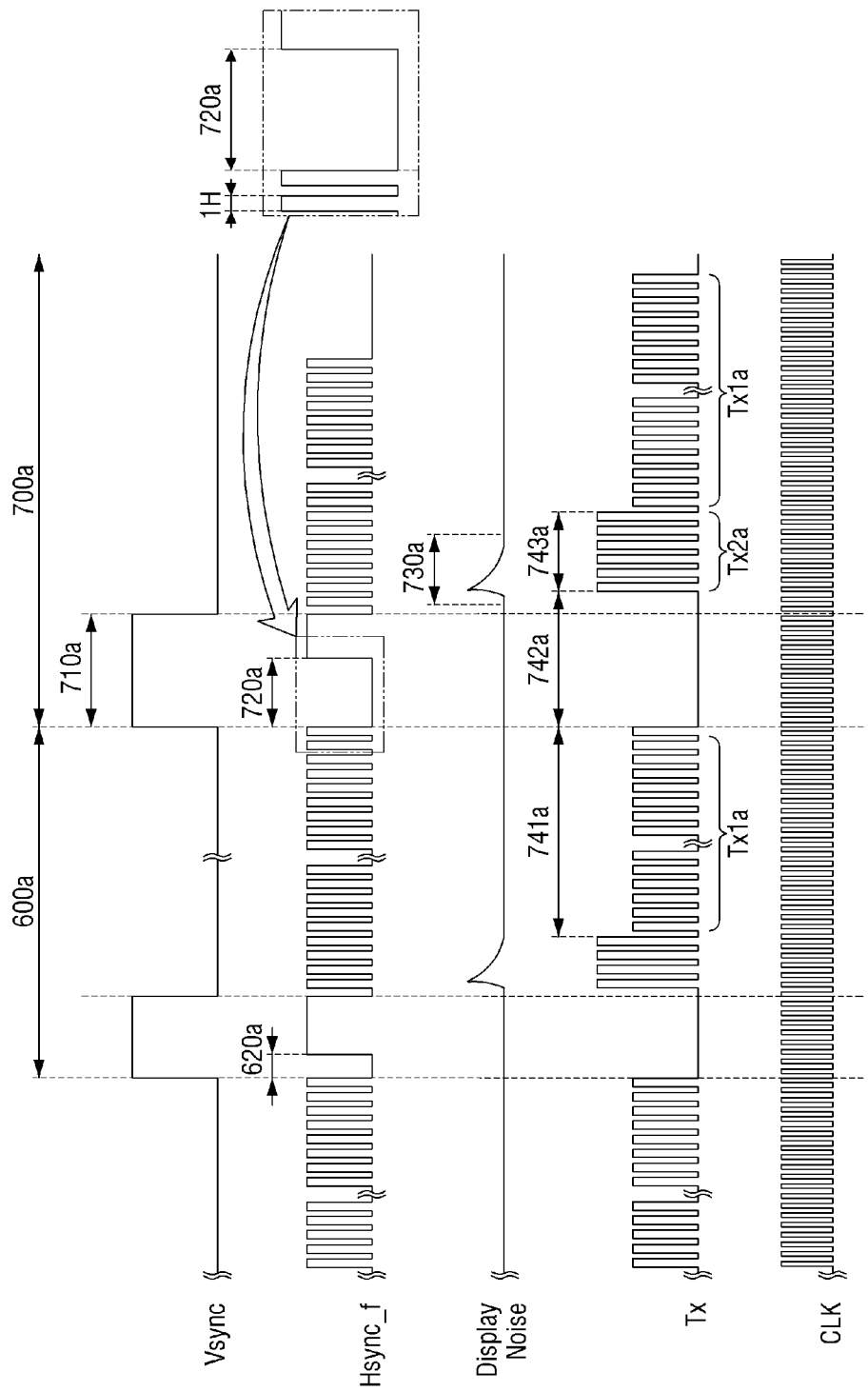
FIG. 13 is a timing diagram that illustrates signals of the display device according to an embodiment.

The signal identifier 241 may identify a porch section 710a (see FIG. 13) of the frame frequency signal Sgn_f and the vertical synchronization signal Vsync using the received vertical synchronization signal Vsync, horizontal synchronization signal Hsync, and frame frequency signal Sgn_f, and generate a synchronization signal generation signal for adjusting the horizontal synchronization signal Hsync in the porch section 710a (see FIG. 13). The porch section may be referred to as a "blank" section (see FIG. 12). The signal identifier 241 may provide the generated synchronization signal generation signal to the synchronization signal generator 244.

The clock generator 242 may output a clock signal. The output clock signal may be provided to the synchronization signal generator 244. The voltage generator 243 may generate a voltage signal used for generating the frame frequency synchronization signal Hsync_f and supply the voltage signal to the synchronization signal generator 244.

The synchronization signal generator 244 may receive the clock signal from the clock generator 242 and receive the voltage signal from the voltage generator 243. The synchronization signal generator 244 may receive the synchronization signal generation signal from the signal identifier 241 and output the frame frequency synchronization signal Hsync_f according to a duty value corresponding to a frame frequency stored in the memory using the received clock signal and voltage signal, and may provide the vertical synchronization signal Vsync and the frame frequency synchronization signal Hsync_f to the touch driver 400.

The duty value refers to a pulse width of the horizontal synchronization signal Hsync in the porch section 710a (see FIG. 13) of the vertical synchronization signal Vsync. For example, the vertical synchronization signal Vsync may include a synchronization signal section having a first signal waveform, and the porch section 710a (see FIG. 13) having a second signal waveform different from the first signal waveform. The frame frequency synchronization signal Hsync_f may include a first section corresponding to the synchronization signal section and a second section corresponding to the porch section 710a (see FIG. 13), and the second section may include a third signal waveform different from the first signal waveform and the second signal waveform, and contain the frame frequency information. These waveforms will be described later.

For example, the duty value 720a (see FIG. 13) may be greater than a pulse width of a plurality of horizontal synchronization signals Hsync. For example, when one pulse width of the horizontal synchronization signal Hsync is 1H, the duty value 720a (see FIG. 13) may have a pulse width that is greater than a pulse width of at least 3H to 4H, and may be less than or equal to a pulse width of 100H.

The memory 245 may store the duty value of the frame frequency synchronization signal Hsync_f according to the frame frequency. The memory 245 may be configured in the form of a lookup table.

For example, when the display driver 200 controls the display panel 100 at 240 Hz, the memory 245 may be configured in the form of a lookup table so that the duty value 720a (see FIG. 13) of the frame frequency synchronization signal Hsync_f in the porch section 710a (see FIG. 13) of the vertical synchronization signal Vsync is 24 µs. In this way, the frame frequency synchronization signal controller 240 may adjust the driving signals of the touch driver 400 so as to compensate for the changing refresh rate of the display panel 100, thereby reducing noise in the touch driving signals, and providing increased touch reliability.

The signal identifier 241, the clock generator 242, the voltage generator 243, the synchronization signal generator 244, and the memory 245 may be formed as integrated circuits (ICs) and be formed integrally with the synchronization signal generator 244, or be separate units mounted on the synchronization signal generator 244, or some combination thereof.

The frame frequency synchronization signal controller 240 varies pulse widths of a signal of at least one of the signal identifier 241, the clock generator 242, and the voltage generator 243 according to the frame frequency, and outputs the signal of which the pulse widths vary to the synchronization signal generator 244. The duty value of the frame frequency synchronization signal Hsync_f corresponds to the duty value corresponding to the frame frequency stored in the memory, such that the frame frequency synchronization signal Hsync_f may have different duty values according to the frame frequencies in the porch section 710a (see FIG. 13) of the vertical synchronization signal Vsync.

With the display device according to an embodiment, even though the frame frequency at which the display driver 200 controls the display panel 100 varies, the vertical synchronization signal Vsync, the horizontal synchronization signal Hsync, and the frame frequency signal Sgn_f received by the frame frequency synchronization signal controller 240 may also vary in response to compensate. Accordingly, the frame frequency synchronization signal controller 240 may generate the varying frame frequency synchronization signal Hsync_f and provide the varying frame frequency synchronization signal Hsync_f to the touch driver 400. In this way, effects from noise of the display signals on the touch driving signals may be mitigated, touch input reliability may be increased, and touch input sensitivity may be maintained.

Figure 7:
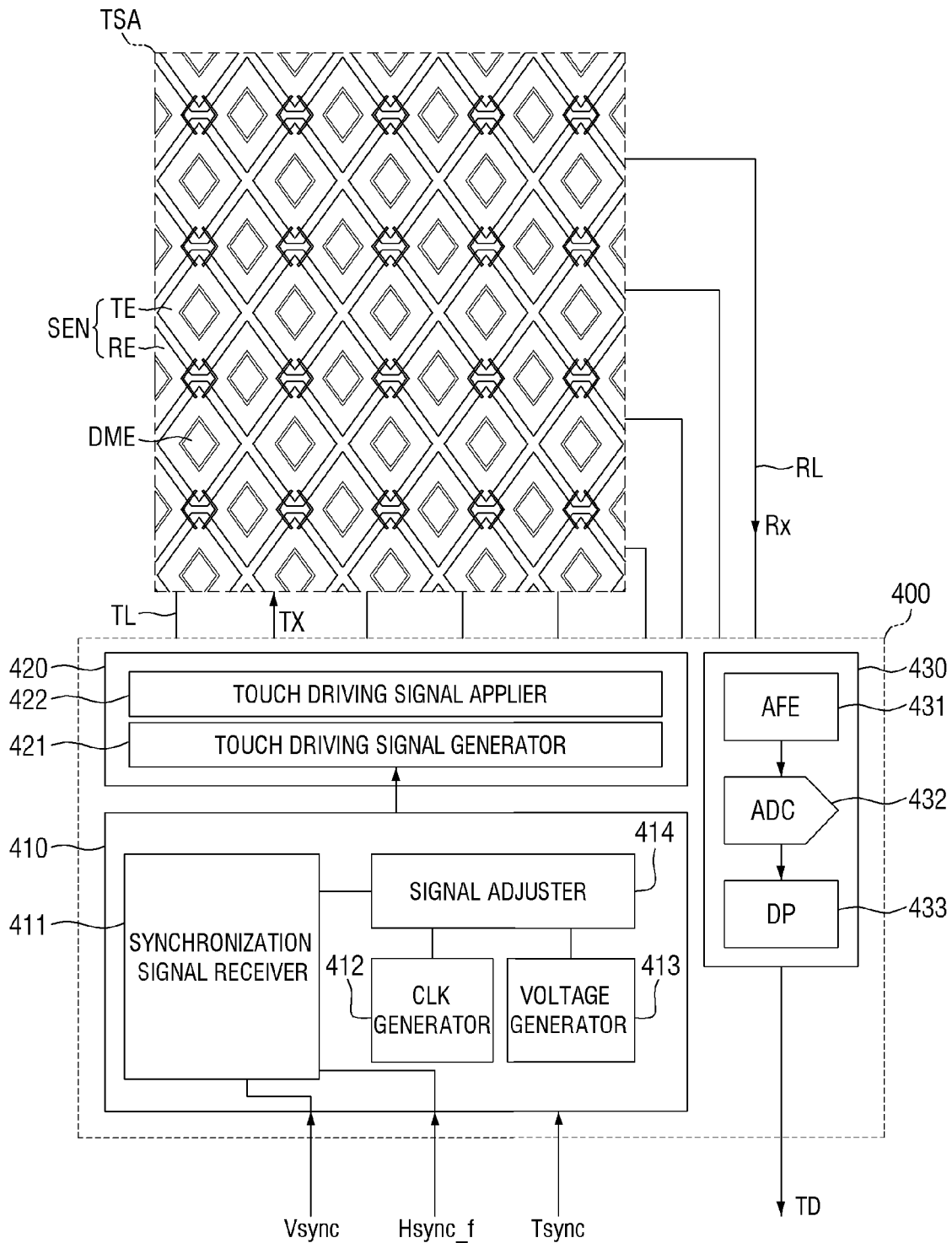
FIG. 7 is a detailed block diagram of the touch driver according to an embodiment.

FIG. 7 is a detailed block diagram of the touch driver according to an embodiment.

The touch driver 400 may include a touch controller 410, a touch driving signal unit 420, and a sensing unit 430.

The touch controller 410 may include a synchronization signal receiver 411, a clock generator 412, a voltage generator 413, and a signal adjuster 414.

The touch controller 410 may supply a touch driving control signal for driving the touch driving signal unit 420 to the touch driving signal unit 420. For example, when a duty value (e.g., a data value stored in the memory) according to the vertical synchronization signal Vsync and the frame frequency synchronization signal Hsync_f is input from the frame frequency synchronization signal controller 240, the touch controller 410 transmits a predetermined touch driving control signal value to the touch driving signal unit 420.

The touch controller 410 may control driving timings of the touch driving signal unit 420 and the sensing unit 430. The touch controller 410 may output timing signals for synchronization according to frame frequencies of the touch driving signal unit 420 and the sensing unit 430. The touch controller 410, the touch driving signal unit 420, and the sensing unit 430 may be formed as separate or integral integrated circuits (ICs) and be mounted on the touch driver 400.

The synchronization signal receiver 411 receives the vertical synchronization signal Vsync and the frame frequency synchronization signal Hsync_f in order to generate the touch driving control signal. For example, when the vertical synchronization signal Vsync and the frame frequency synchronization signal Hsync_f are input from the frame frequency synchronization signal controller 240, the synchronization signal receiver 411 may identify a duty value of the frame frequency synchronization signal Hsync_f and generate a signal adjustment control signal for adjusting the touch driving signal TX according to the frame frequency. The synchronization signal receiver 411 may then provide the generated signal adjustment control signal to the signal adjuster 414.

The clock generator 412 may output a clock signal and provide the clock signal to the signal adjuster 414. The voltage generator 413 may generate a voltage signal used for generating the frame frequency synchronization signal Hsync_f and supply the voltage signal to the signal adjuster 414.

The signal adjuster 414 may receive the clock signal from the clock generator 412 and receive the voltage signal from the voltage generator 413. The signal adjuster 414 may receive the signal adjustment control signal from the synchronization signal receiver 411 and identify a frame frequency according to a preset duty value (e.g., a data value included in a lookup table stored in the memory). The signal adjuster 414 may output the touch driving control signal according to a touch driving pulse corresponding to the frame frequency using the identified frame frequency and the received clock signal and voltage signal, and provide the touch driving control signal to the touch driving signal unit 420.

The synchronization signal receiver 411, the clock generator 412, the voltage generator 413, and the signal adjuster 414 may be formed as integrated circuits (ICs) and be formed integrally with the touch controller 410 or be mounted on the touch controller 410. In some embodiments, one or more of the components described with reference to FIG. 7 may be implemented in a single integrated circuit, may be implemented as separate circuits, or some combination of combined and individual circuits.

The touch driving signal unit 420 may include a driving signal generator 421 and a touch driving signal applier 422.

The touch driving signal unit 420 may be connected to the plurality of driving electrodes TE through the plurality of touch driving lines TL. The touch driving signal unit 420 may supply the touch driving signals TX to the plurality of driving electrodes TE. The touch driving signal TX may have a plurality of driving pulses. The touch driving signal unit 420 may supply the touch driving signals TX to the plurality of touch driving lines TL. For example, the touch driving signal unit 420 may sequentially output the touch driving signals TX from the plurality of driving electrodes TE disposed on one side of the touch panel to the plurality of driving electrodes TE disposed on the other side of the touch panel.

The touch driving signal generator 421 may receive the touch driving control signal adjusted according to the frame frequency by the signal adjuster 414 and generate the touch driving signals TX according to each frame frequency.

The touch driving signal applier 422 may supply the touch driving signals TX received from the touch driving signal generator 421 through the plurality of touch driving lines TL to the plurality of driving electrodes TE. For example, the touch driving signal applier 422 may sequentially output the touch driving signals TX from the plurality of driving electrodes TE disposed on one side of the touch panel to the plurality of driving electrodes TE disposed on the other side of the touch panel.

The sensing unit 430 may include an analog front end 431, an analog-to-digital converter 432, and a digital processor 433.

The sensing unit 430 may be connected to the plurality of sensing electrodes RE through the plurality of touch sensing lines RL. The sensing unit 430 may sense amounts of change in mutual capacitance between the plurality of driving electrodes TE and the plurality of sensing electrodes RE through the plurality of touch sensing lines RL. For example, the sensing unit 430 may include an integrated circuit including at least one operational amplifier configured to sense a change in capacitance from the sensing electrode RE of the touch unit TSU and a capacitor with a predetermined capacitance. An inverting input terminal of the operational amplifier may be connected to the sensing electrode RE to output the change in capacitance as an analog signal.

The analog signal received by the analog front end 431 may be converted into a digital signal. The analog front end 431 may include a capacitor, a switch, a resistor, an amplifier, and a sample and holder. The implementation form of the analog front end 431 is not necessarily limited to the one described here. For example, in one embodiment, a voltage corresponding to electric charges charged in the capacitor may be sampled by the sample and holder, and then held for a predetermined period.

The analog-to-digital converter 432 may convert an output of the analog front end 431 to generate sensed data. The analog-to-digital converter 432 may convert a sampled signal into digital data and output the digital data.

In addition, the digital processor 433 may process the sensed data to generate touch data TD.

The sensing unit 430 maybe controlled by the touch controller 410 in order to sense a touch signal using the analog front end 431, the analog-to-digital converter 432, and the digital processor 433.

The analog front end 431, the analog-to-digital converter 432, and the digital processor 433 may be formed as integrated circuits (ICs) and be formed integrally with the sensing unit 430 or be mounted on the sensing unit 430. In some embodiments, the analog front end 431, the analog-to-digital converter 432, and the digital processor 433 may each be formed as separate integrated circuits. In other embodiments, they may be implemented in a single integrated circuit.

Accordingly, as the frame frequency input to the display driver 200 varies, the frame frequency synchronization signal Hsync_f generated by the frame frequency synchronization signal controller 240 may also vary. The touch driver 400 may receive the varying frame frequency synchronization signal Hsync_f and output the touch driving signal TX corresponding to the duty value of the frame frequency synchronization signal Hsync_f. Accordingly, in some embodiments, by changing the touch driving signal TX in response to the frame frequency input to the display driver 200, effects from noise of the display signals on the touch driving signals may be mitigated, touch input reliability may be increased, and touch input sensitivity may be maintained.

Figure 8:
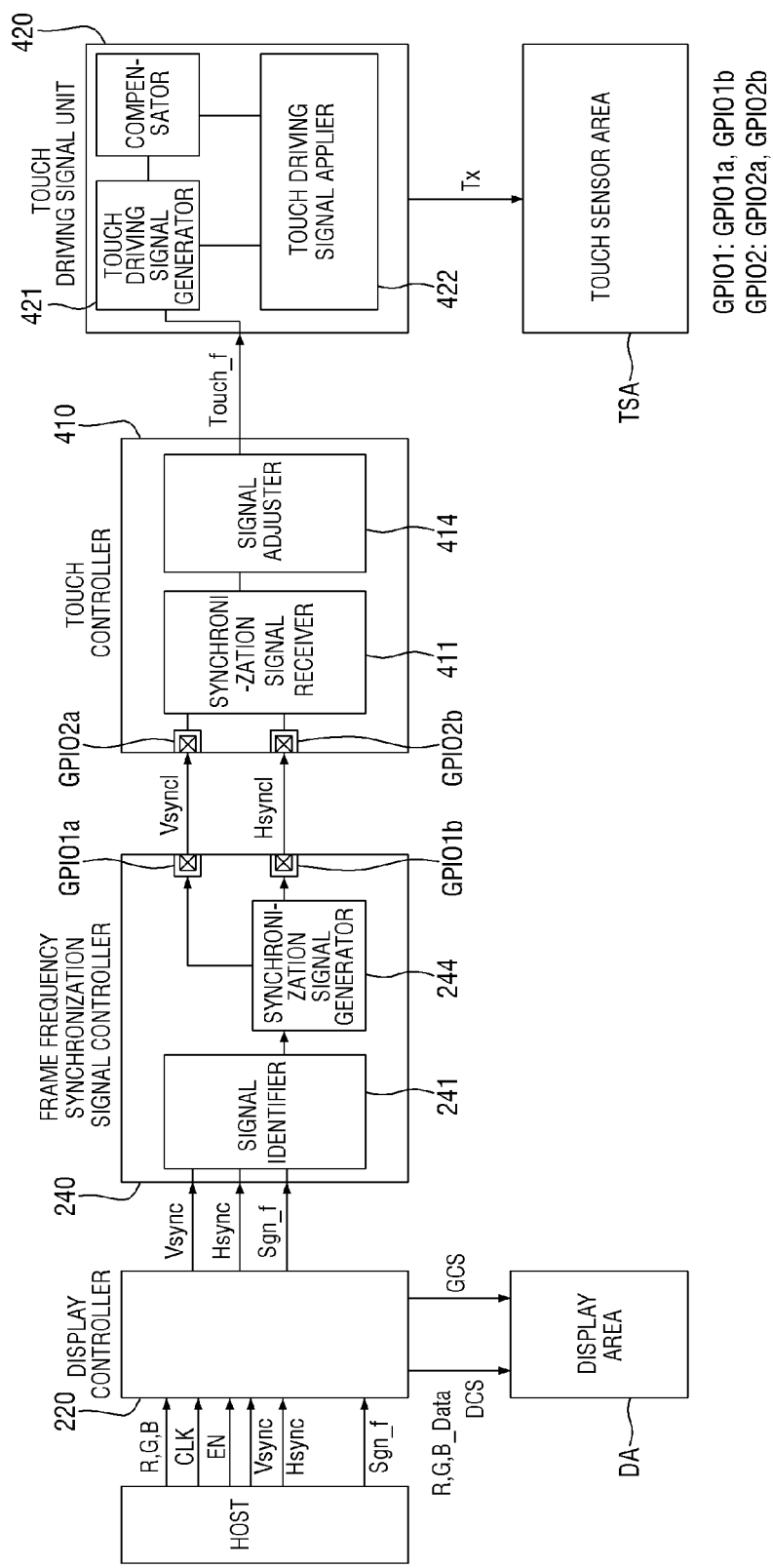
FIG. 8 is a block diagram that illustrates a relationship between a display driver and the touch driver according to an embodiment.
Figure 9:
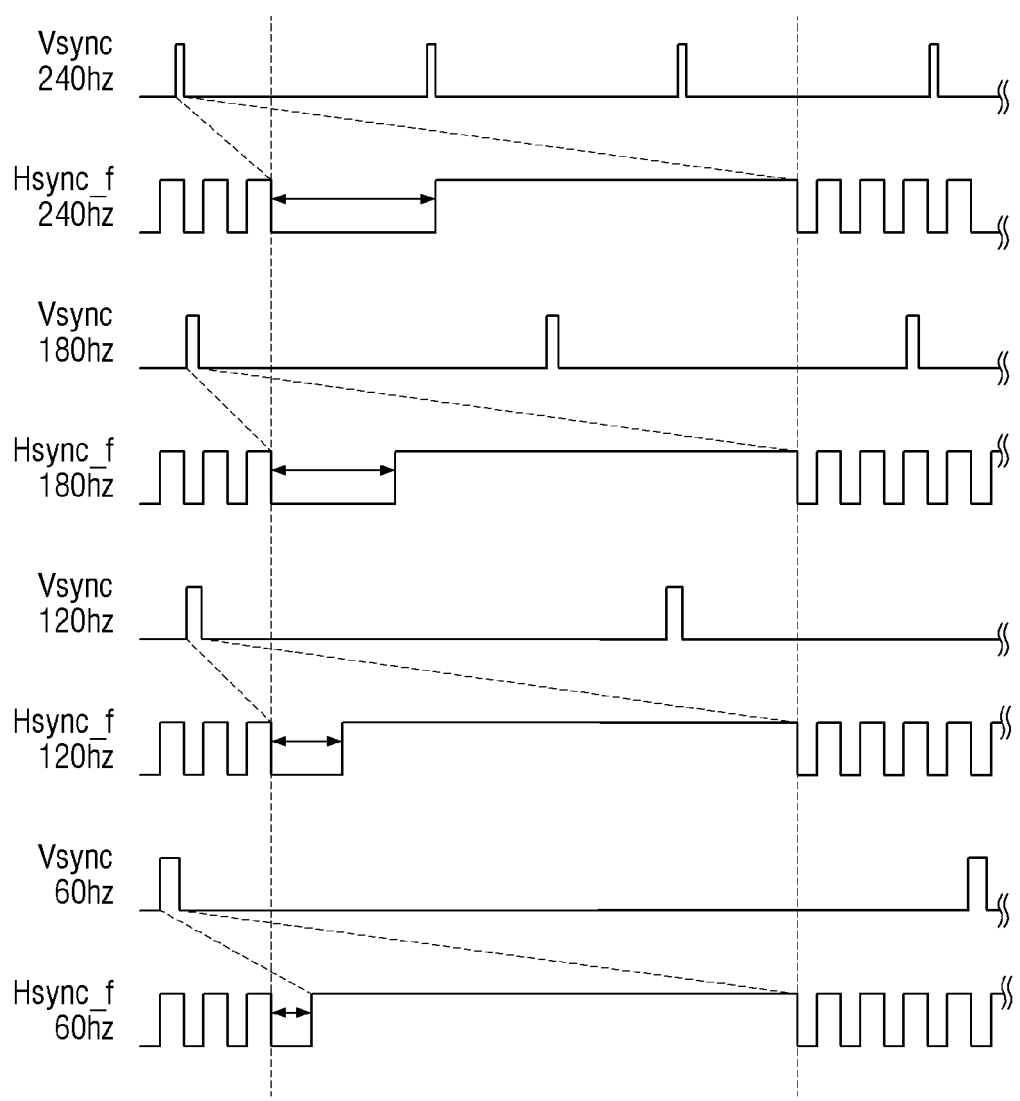
FIGS. 9 and 10 are timing diagrams that illustrate a method of driving the display driver according to an embodiment.
Figure 10:
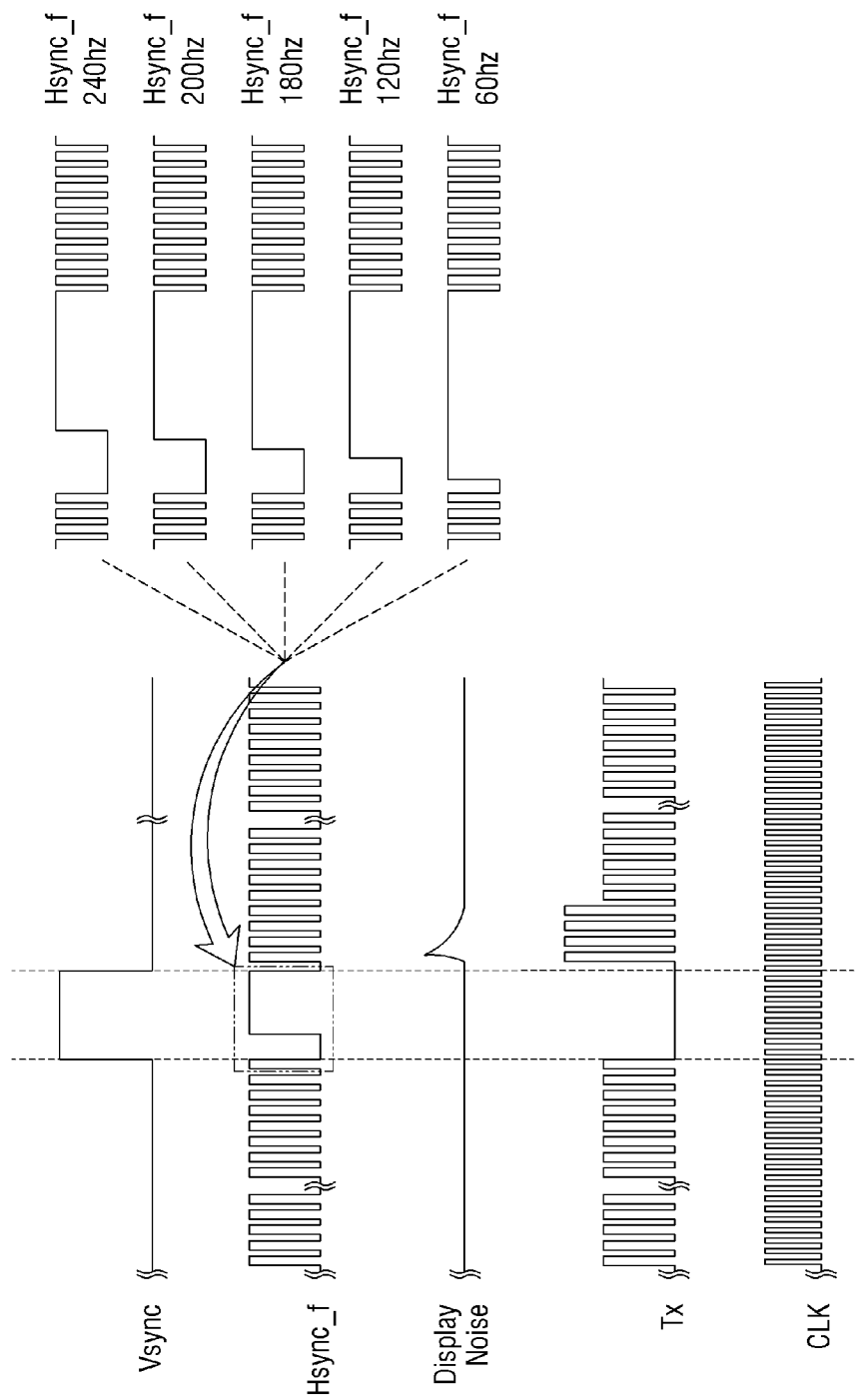

FIG. 8 is a block diagram that illustrates a relationship between a display driver and the touch driver according to an embodiment. FIGS. 9 and 10 are timing diagrams that illustrate a method of driving the display driver according to an embodiment.

Referring to FIG. 8, the touch driver 400 may receive the vertical synchronization signal Vsync and the frame frequency synchronization signal Hsync_f from the display driver 200 and determine a section in which the gate signals and the data signals are transmitted.

For example, the display driver 200 and the touch driver 400 may transmit and receive signal information to and from each other through a plurality of signal lines, respectively. The plurality of signal lines may include a vertical synchronization signal information line Vsync1 and a horizontal synchronization signal information line Hsync1. For example, the plurality of signal lines may be connected to the touch driver 400 and the display driver 200 in a manner in which output/input pins GPIO1 and GPIO2 disposed at both ends thereof are coupled to the touch driver 400 and the display driver 200, respectively. For example, an output pin GPIO1a of the vertical synchronization signal information line Vsync1 may be connected to the display driver 200 (e.g., to the frequency synchronization signal controller 240 of the display driver 200), and an input pin GPIO2a of the vertical synchronization signal information line Vsync1 may be connected to the touch driver 400 (e.g., to the touch controller 410 of the touch driver 400).

In addition, an output pin GPIO1b of the horizontal synchronization signal information line Hsync1 may be connected to the display driver 200 (e.g., to the frequency synchronization signal controller 240 of the display driver 200), and an input pin GPIO2b of the horizontal synchronization signal information line Hsync1 may be connected to the touch driver 400 (e.g., to the touch controller 410 of the touch driver 400). Each of the vertical synchronization signal Vsync and the frame frequency synchronization signal Hsync_f provided from the display driver 200 to the touch driver 400 may be transmitted as a voltage signal having a pulse form having a preset duty value.

The duty value of the frame frequency synchronization signal Hsync_f supplied from the display driver 200 to the touch driver 400 may vary. For example, the display driver 200 may include the frame frequency synchronization signal controller 240 in order to vary the duty value of the frame frequency synchronization signal Hsync_f. The frame frequency synchronization signal controller 240 may adjust the output the frame frequency synchronization signal Hsync_f by adjusting the duty value. The frame frequency synchronization signal controller 240 may be electrically connected to the output pin GPIO1b of the horizontal synchronization signal information line Hsync1.

However, a duty value of the corresponding vertical synchronization signal Vsync and/or frame frequency synchronization signal Hsync_f for each frame frequency may be adjusted to have a preset duty value (e.g., a data value in the form of a lookup table stored in the memory). For example, as the frame frequency decreases, the duty value of the corresponding vertical synchronization signal Vsync and/or frame frequency synchronization signal Hsync_f may be set to decrease, but the disclosure is not necessarily limited thereto.

For example, the frame frequency of the display panel 100 may vary within a range of 1 Hz to 240 Hz. In some embodiments, the display driver 200 may control the display panel 100 to be driven at three or more frequencies within the range described above. For example, the display device 10 may be selectively driven at frame frequencies of 60 Hz, 120 Hz, 180 Hz, 200 Hz, and 240 Hz according to host's or user's selection, or to a preconfigured response to usage or to an application, or the like.

The frame frequency may vary in several forms. For example, the display driver 200 may control the display panel 100 to be driven at 60 Hz for one section and to be driven at 120 Hz for another section. However, a frequency at which the display panel 100 is driven is not necessarily limited to the frame frequency described above.

The touch driver 400 may receive the vertical synchronization signal Vsync and the frame frequency synchronization signal Hsync_f from the display driver 200 by adjusting the duty value of the frame frequency synchronization signal Hsync_f. The touch driving signal TX adjusted according to the varying frame frequency may be provided to the touch driver 400.

In an embodiment, the duty value of the vertical synchronization signal Vsync and/or frame frequency synchronization signal Hsync_f recognized by the touch driver 400 may be adjusted to recognize a preset duty value (e.g., a data value in the form of a lookup table stored in the memory). For example, as the frame frequency decreases, the duty value of the corresponding vertical synchronization signal Vsync and/or frame frequency synchronization signal Hsync_f may be set to decrease, but the relationship of the duty value to the frame frequency is not necessarily limited thereto.

In addition, the vertical synchronization signal Vsync may include a synchronization signal section having a first signal waveform, and the porch section 710a (see FIG. 13) having a second signal waveform different from the first signal waveform. The frame frequency synchronization signal Hsync_f may include a first section corresponding to the synchronization signal section and a second section corresponding to the porch section 710a (see FIG. 13), and the second section may include a third signal waveform different from the first signal waveform and the second signal waveform, and may have frame frequency information. These waveforms will be described later.

Referring to FIGS. 9 and 10, as described above, the touch driver 400 may receive the frame frequency synchronization signal Hsync_f having various duty values from the display driver 200. The touch driver 400 may recognize at which frequency the display driver 200 is currently controlling the display panel 100 based on the duty value of the frame frequency synchronization signal Hsync_f received from the display driver 200.

For example, when the duty value of the frame frequency synchronization signal Hsync_f of the horizontal synchronization signal Hsync provided to the touch driver 400 is 24 μs, the touch driver 400 may recognize that the display driver 200 is controlling the display panel 100 at 240 Hz.

In some examples, when the duty value of the frame frequency synchronization signal Hsync_f of the horizontal synchronization signal Hsync provided to the touch driver 400 is 20 μs, the touch driver 400 may recognize that the display driver 200 is controlling the display panel 100 at 200 Hz.

In some examples, when the duty value of the frame frequency synchronization signal Hsync_f of the horizontal synchronization signal Hsync provided to the touch driver 400 is 18 μs, the touch driver 400 may recognize that the display driver 200 is controlling the display panel 100 at 180 Hz.

In some examples, when the duty value of the frame frequency synchronization signal Hsync_f of the horizontal synchronization signal Hsync provided to the touch driver 400 is 12 μs, the touch driver 400 may recognize that the display driver 200 is controlling the display panel 100 at 120 Hz.

In some examples, when the duty value of the frame frequency synchronization signal Hsync_f of the horizontal synchronization signal Hsync provided to the touch driver 400 is 6 μs, the touch driver 400 may recognize that the display driver 200 is controlling the display panel 100 at 60 Hz.

When one pulse width of the vertical synchronization signal Hsync is 1H, the duty value 720a (see FIG. 13) may be greater than a pulse width of a plurality of vertical synchronization signals Hsync. For example, the duty value 720a (see FIG. 13) may have a pulse width greater than a pulse width of at least 3H to 4H.

A section in which the touch driver 400 outputs the touch driving signal TX according to the corresponding duty value of the frame frequency synchronization signal Hsync_f may not overlap a period in which the display driver 200 provides the gate signals to the display panel 100 and/or a period in which the display driver 200 provides the data signals to the display panel 100.

In the display device according to the embodiment, as the frame frequency input to the display driver 200 varies, the frame frequency synchronization signal Hsync_f generated by the frame frequency synchronization signal controller 240 may also vary. The varying frame frequency synchronization signal Hsync_f may be provided to the touch driver 400 through the horizontal synchronization signal information line Hsync1 and the vertical synchronization signal information line Vsync1. The touch driver 400 may receive the varying frame frequency synchronization signal Hsync_f and output the touch driving signal TX corresponding to the duty value of the frame frequency synchronization signal Hsync_f.

Figure 11:
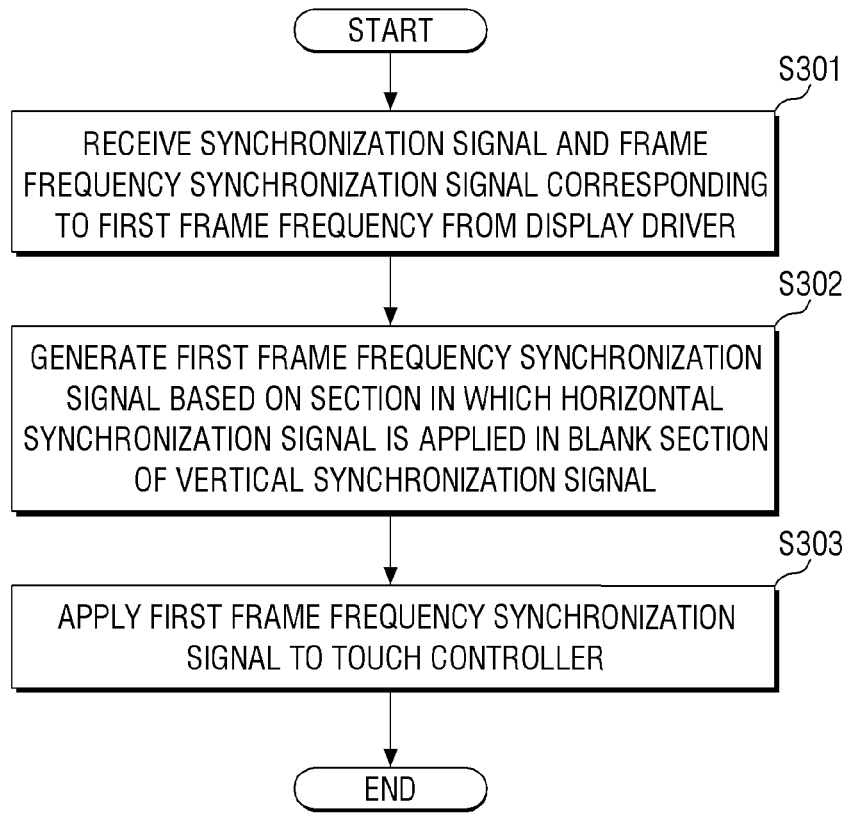
FIGS. 11 and 12 are flowcharts for describing operations of the display device according to an embodiment.

FIGS. 11 and 12 are flowcharts for describing operations of the display device. FIG. 13 is a timing diagram that illustrates signals of the display device according to an embodiment.

Referring to FIG. 11, first, signals corresponding to a first frame frequency 600a are received from the display driver 200 by the frame frequency synchronization signal controller 240 (S301).

For example, the signals corresponding to the first frame frequency 600a may be the vertical synchronization signal Vsync, the horizontal synchronization signal Hsync, and the frame frequency signal Sgn_f. The first frame frequency 600a may be a frame frequency of a screen to be displayed on the display panel 100. For example, the first frame frequency 600a may be 60 Hz.

Then, a first frame frequency synchronization signal Hsync_f is generated based on a frame frequency in the porch section 710a of the vertical synchronization signal Vsync (S302).

In some embodiments, the first frame frequency synchronization signal Hsync_f is generated based on the vertical synchronization signal Vsync, the horizontal synchronization signal Hsync, and the frame frequency signal Sgn_f received from the display driver 200. In this case, duty values of the vertical synchronization signal Vsync and the frame frequency synchronization signal Hsync_f correspond to the duty values corresponding to the frame frequencies stored in the memory. Accordingly, the first frame frequency synchronization signal Hsync_f having the duty value according to the frame frequency is generated in the porch section 710a of the vertical synchronization signal Vsync.

In this example, the vertical synchronization signal Vsync may include a synchronization signal section having a first signal waveform and the porch section 710a (see FIG. 13) having a second signal waveform different from the first signal waveform. The frame frequency synchronization signal Hsync_f may include a first section corresponding to the synchronization signal section and a second section corresponding to the porch section 710a (see FIG. 13), and the second section may include a third signal waveform different from the first signal waveform and the second signal waveform and having frame frequency information.

Then, the first frame frequency synchronization signal is applied to the touch controller (S303).

Referring to FIGS. 11 and 13, a signal output from the display driver 200 and received by the touch controller 410 may include the vertical synchronization signal Vsync and the first frame frequency synchronization signal Hsync_f. In some examples, the synchronization signal received from the display driver 200 by the touch driver 400 may further include a data enable (DE) signal and/or a tearing effect (TE) signal. A first touch driving signal Tx1a is applied to the touch unit TSU by the touch driver 400.

In a section in which the frame frequency of the screen to be displayed on the display panel 100 is the first frame frequency 600a, the first touch driving signal Tx1a may be applied to the touch unit TSU. The first touch driving signal Tx1a may be based on the section in which the vertical synchronization signal Vsync and the first frame frequency synchronization signal Hsync_f are applied, e.g. the section in which the frame frequency of the screen to be displayed on the display panel 100 is the first frame frequency 600a. When the vertical synchronization signal Vsync and the first frame frequency synchronization signal Hsync_f corresponding to the first frame frequency 600*a* are received from the display driver 200, the touch controller 410 included in the touch driver 400 may apply the first touch driving signal Tx1*a* to the touch unit TSU based on the section in which the synchronization signals are applied.

FIG. 12 is a flowchart for describing operations of the display device.

The operations of the display device of FIG. 12 may further include operations in which the frame frequency varies to a second frame frequency in the operations of the first frame frequency 600*a* of FIG. 11. S401 to S403 are substantially similar to S301 to S303 of FIG. 11, and an overlapping description thereof will be omitted to avoid redundancy.

Referring to FIGS. 12 and 13, first, signals corresponding to a second frame frequency 700*a* are received from the display driver 200 by the frame frequency synchronization signal controller 240 (S404).

For example, the signals corresponding to the second frame frequency 700*a* may be the vertical synchronization signal Vsync, the horizontal synchronization signal Hsync, and the frame frequency signal Sgn_f. The second frame frequency 700*a* may be a frame frequency of a screen to be displayed on the display panel 100. The second frame frequency 700*a* may be higher than the first frame frequency 600*a*. For example, when the first frame frequency 600*a* is 60 Hz, the second frame frequency 700*a* may be 120 Hz.

Then, a second frame frequency synchronization signal Hsync_f is generated based on a frame frequency in the porch section 710*a* of the vertical synchronization signal Vsync (S405).

For example, the second frame frequency synchronization signal Hsync_f is generated based on the vertical synchronization signal Vsync, the horizontal synchronization signal Hsync, and the frame frequency signal Sgn_f received from the display driver 200. A first duty value 620*a* corresponding to a first display frequency may be generated before a display frequency is updated. In this case, duty values of the vertical synchronization signal Vsync and the frame frequency synchronization signal Hsync_f correspond to the duty values corresponding to the frame frequencies stored in the memory. Accordingly, the second frame frequency synchronization signal Hsync_f having the duty value 720*a* according to the second frame frequency 700*a* is generated in the porch section 710*a* of the vertical synchronization signal Vsync.

Then, the second frame frequency synchronization signal is applied to the touch controller (S406).

Referring to FIG. 13, a signal received from the display driver 200 by the touch controller 410 may include the vertical synchronization signal Vsync and the second frame frequency synchronization signal Hsync_f. In some embodiments, the synchronization signal received from the display driver 200 by the touch driver 400 may further include at least one of a data enable (DE) signal and a tearing effect (TE) signal.

The first touch driving signal Tx1*a* may be applied to the touch unit TSU in a section in which the frame frequency of the screen to be displayed on the display panel 100 is the second frame frequency 700*a*. The first touch driving signal Tx1*a* may be based on a section in which the vertical synchronization signal Vsync and the second frame frequency synchronization signal Hsync_f are applied, e.g. the section which the frame frequency of the screen to be displayed on the display panel 100 is the second frame frequency 700*a*. When the vertical synchronization signal Vsync and the second frame frequency synchronization signal Hsync_f corresponding to the second frame frequency 700*a* are received from the display driver 200, the touch controller 410 included in the touch driver 400 may apply the first touch driving signal Tx1*a* to the touch unit TSU based on the section in which the synchronization signals are applied.

In the section which the frame frequency of the screen to be displayed on the display panel 100 is the second frame frequency 700*a*, pulses of the first touch driving signal Tx1*a* may not overlap pulses of the vertical synchronization signal Vsync and the second frame frequency synchronization signal Hsync_f. This may reduce possible noise interference of the synchronization frequencies with the touch driving signals.

In FIG. 13, display noise generated in the pixels SP arranged in a column direction is exemplified as noise for the touch driving signal TX acting from the display unit DU. As described above, when the touch unit TSU is disposed on the display unit DU so as to overlap the display unit DU and the spacing between the touch unit TSU and the display unit DU is small, and when the intervals of the display driving signals and the touch driving signals are rapid, electrical interactions may exist between the gate signals and the data signals of the display driver 200 and the touch driving signals TX and the touch sensing signals RX of the touch unit. Therefore, any one signal may serve as noise for another signal. For example, in the touch driving signals TX and the touch sensing signals RX, the gate signals and the data signals may act as the display noise, and the touch driving signals TX are affected by noise when the data signals are provided to the pixels SP arranged in the column direction. The gate signals and the data signals may act as the display noise for the touch driving signals TX and the touch sensing signals RX. In this case, touch accuracy and/or sensitivity may be reduced.

Accordingly, the display driver 200 according to the present disclosure may provide the vertical synchronization signal Vsync and the second frame frequency synchronization signal Hsync_f to the touch controller 410 so as to apply the second touch driving signal Tx2*a* in a display noise section 730*a* generated in a section in which the gate signals and the data signals are transmitted.

Therefore, when the vertical synchronization signal Vsync and the second frame frequency synchronization signal Hsync_f are received from the display driver 200, the touch controller 410 may apply the second touch driving signal Tx2*a* to the touch unit TSU during the display noise section 730*a*. The touch controller 410 may not apply the first touch driving signal to the touch controller 410 during the display noise section 730*a*. Pulses of the second touch driving signal Tx2*a* may not overlap the pulses of the vertical synchronization signal Vsync and the second frame frequency synchronization signal Hsync_f.

In some cases, the gate signals and the data signals may act as the display noise for the touch driving signals TX and the touch sensing signals RX.

Accordingly, the frame frequency synchronization signal controller 240 may provide the vertical synchronization signal Vsync and the frame frequency synchronization signal Hsync_f to the touch driver 400 in order to recognize the section in which the gate signals and the data signals according to the frame frequency are transmitted, and the touch driver 400 may receive the above-described signals and generate the touch driving signals TX so as to avoid the display noise according to the section in which the gate signals and the data signals are transmitted. For example, even though the frame frequency varies, an influence of the noise on the touch driving signals TX acting from the display panel 100 may be minimized.

For example, even though the frame frequency at which the display driver 200 controls the display panel 100 varies, an influence of the display noise section 730a on the touch driving signals TX acting from the display panel 100 may be minimized, and the touch controller 410 may accurately recognize a user's touch input. In addition, distortion of the touch driving signals TX due to the data signals may be decreased, and distortion of an image quality may be minimized while maintaining reliability of touch sensitivity.

Figure 14:
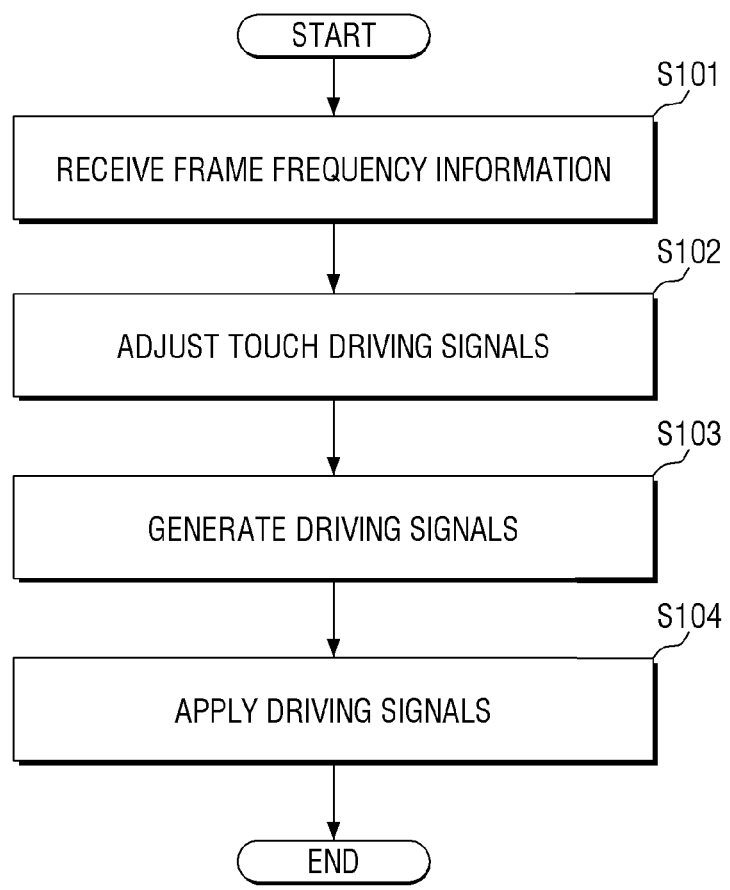
FIGS. 14 and 15 are flowcharts that illustrate a method of driving the touch driver according to embodiments.
Figure 15:
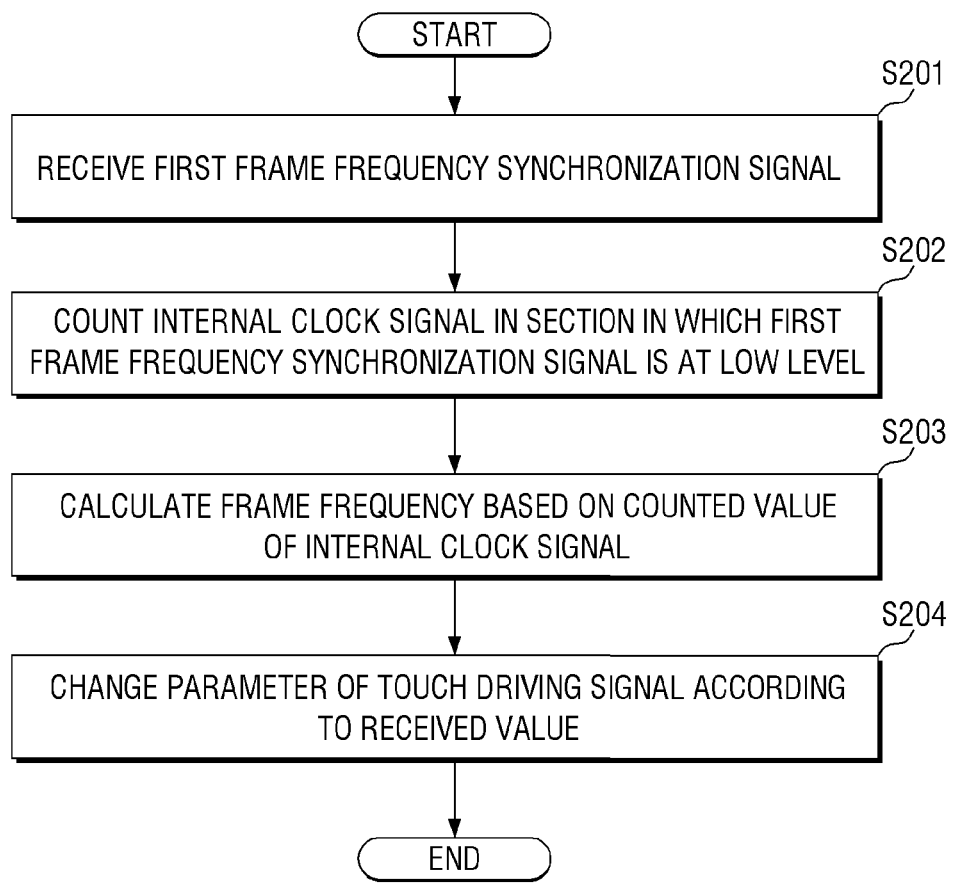

FIGS. 14 and 15 are flowcharts that illustrate a method of driving the touch driver according to embodiments.

Referring to FIG. 14, first, frame frequency information is received (S101).

The touch controller 410 may receive the vertical synchronization signal Vsync and the frame frequency synchronization signal Hsync_f from the frame frequency synchronization signal controller 240 of the display driver 200 through a communication interface in order to recognize frame frequency information.

Then, the touch controller 410 adjusts the touch driving signals (S102).

The adjusting (S102) of the touch driving signals includes adjusting the touch driving control signal in order to adjust voltage values of the touch driving signals TX by providing voltage change values according to voltage changes of the touch driving signals TX according to the respective frame frequency signals Sgn_f received in the receiving (S101) of the frame frequency information, and is performed by the touch controller 410.

In this example, the voltage changes of the touch driving signals TX according to the frame frequencies include, for example, voltage change values derived by performing a predetermined simulation through a software method in a separate device, and may be stored in a lookup table.

Next, the touch driving signals are generated (S103).

The generating (S103) of the touch driving signals includes generating the touch driving signals TX to which the voltage changes of the touch driving signals TX according to the frame frequencies are applied through the adjusting (S102) of the touch driving signals, and may be performed by the touch driving signal generator 421 of touch driving signal unit 420. Here, the touch driving signal TX may have a form of a sine wave.

Then, the driving signals are applied to the touch panel (S104).

The touch driving signals TX to which phase changes of the touch driving signals according to the frame frequencies generated in the generating (S103) of the touch driving signals are applied may be simultaneously supplied to the plurality of touch electrodes TE of the touch panel.

Referring to FIG. 15, the touch controller 410 according to embodiments receives the first frame frequency synchronization signal Hsync_f from the frame frequency synchronization signal controller 240 (S201).

The touch controller 410 counts one cycle of an internal clock signal during a time section in which it receives the first frame frequency synchronization signal Hsync_f from the frame frequency synchronization signal controller 240 (S202).

In addition, when the touch controller 410 receives a low-level counter enable signal from the frame frequency synchronization signal controller 240, the touch controller 410 transfers a counted value of the internal clock signal counted during a time section in which it receives a high-level counter enable signal to the touch driving signal unit 420. In some embodiments, the counted value of the internal clock signal may be written in a register of the touch controller 410 and be read by the touch driving signal unit 420 through an input/output interface with the touch controller 410.

Then, the touch controller 410 calculates the frame frequency based on the counted value of the internal clock signal (S203).

The calculated value may be input to the touch controller 410 by the frame frequency synchronization signal controller 240 through an input/output interface with the touch controller 410.

The touch controller 410 changes a parameter of the touch driving signal according to the calculated value (S204).

Changing the parameter may include adjusting voltages of the touch driving signals TX or adjusting capacitances of capacitors. It may also include adjusting sampling values in order to avoid the display noise (see FIG. 13). However, the above-described parameter change is not necessarily limited thereto.

Therefore, even though the frame frequency at which the display driver 200 controls the display panel 100 varies, the touch controller 410 may accurately recognize the user's touch input. Accordingly, even though the frame frequency varies, an influence of the display noise section 730a on the touch driving signals TX acting from the display panel 100 may be minimized.

In addition, distortion of the touch driving signals TX due to the data signals may be decreased, and distortion of an image quality may be minimized while maintaining reliability of touch sensitivity.

Figure 16:
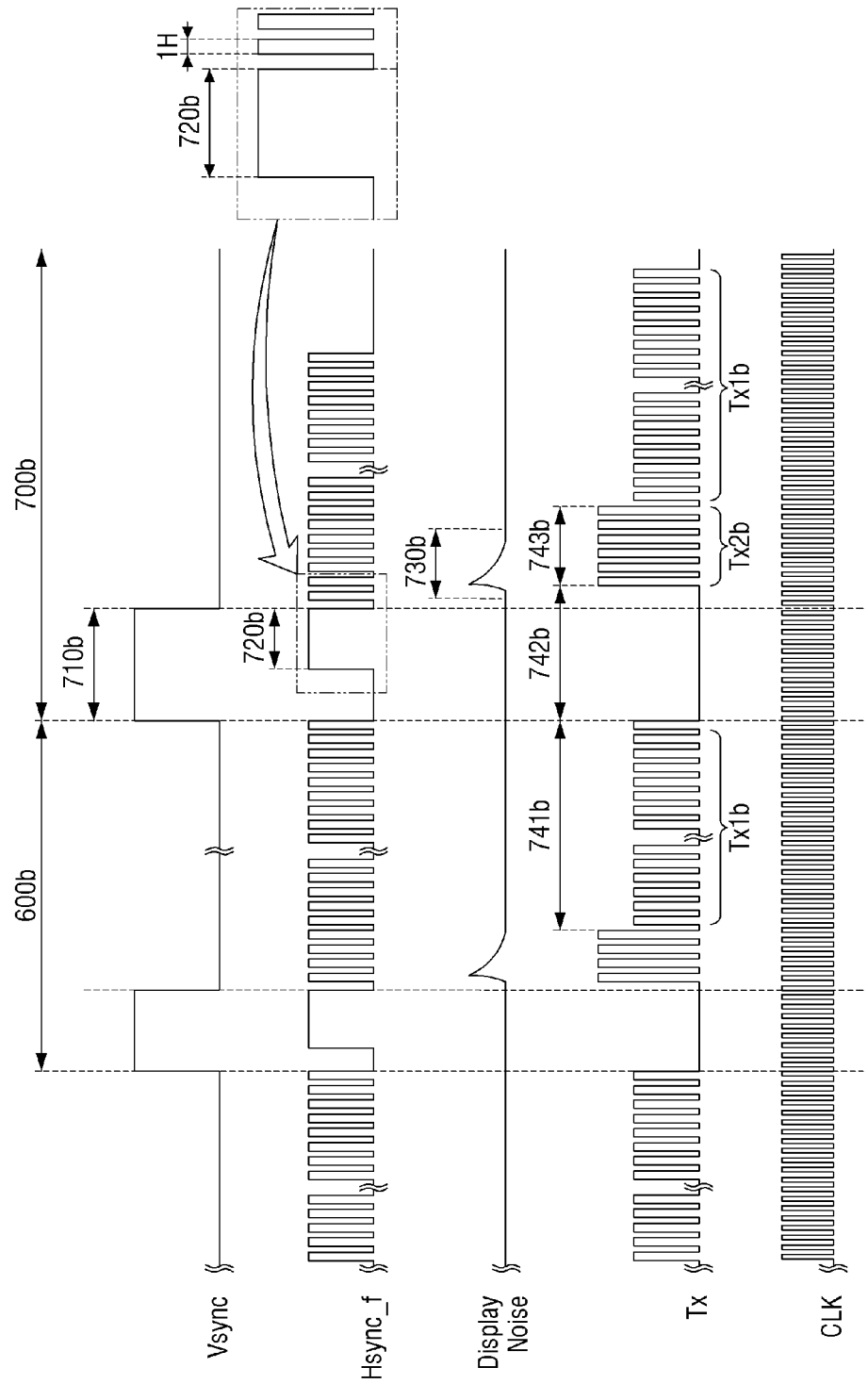
FIG. 16 is a timing diagram that illustrates a method of driving a display driver according to another embodiment.

FIG. 16 is a timing diagram that illustrates a method of driving a display driver according to another embodiment.

A method of driving a display driver illustrated in FIG. 16 is substantially similar to the method of driving the display driver illustrated in FIG. 13 except that a duty value 720b of a porch section 710b is different from the duty value 720a of the porch section 710a, and an overlapping description thereof will thus be omitted.

Referring to FIG. 16, a first touch driving signal Tx1b may be applied to the touch unit TSU in a section in which a frame frequency of a screen to be displayed on the display panel 100 is a second frame frequency 700b. The first touch driving signal Tx1b may be based on a section in which the vertical synchronization signal Vsync and the second frame frequency synchronization signal Hsync_f are applied, e.g. the section which the frame frequency of the screen to be displayed on the display panel 100 is the second frame frequency 700b. When the vertical synchronization signal Vsync and the second frame frequency synchronization signal Hsync_f corresponding to the second frame frequency 700b are received from the display driver 200, the touch controller 410 included in the touch driver 400 may apply the first touch driving signal Tx1b to the touch unit TSU based on the section in which the synchronization signals are applied.

The duty value 720b of the second frame frequency synchronization signal Hsync_f may be a high section. The "high section" of the signal may refer to an interval of the signal with a relatively high value, e.g. an "on" value as opposed on an "off" value. For example, the second frame frequency synchronization signal Hsync_f is generated based on the vertical synchronization signal Vsync, the horizontal synchronization signal Hsync, and the frame frequency signal Sgn_f received from the display driver 200. In this case, duty values of the vertical synchronization signal Vsync and the frame frequency synchronization signal Hsync_f correspond to the duty values corresponding to the frame frequencies stored in the memory. Accordingly, the second frame frequency synchronization signal Hsync_f having the high section according to the frame frequency is generated in the porch section 710*b* of the vertical synchronization signal Vsync.

When one pulse width of the vertical synchronization signal Hsync is 1H, the duty value 720*b* may be greater than a pulse width of a plurality of vertical synchronization signals Hsync. For example, the duty value 720*b* may have a pulse width of at least 3H to 4H.

This timing is similar to FIG. 13 in that the display driver 200 provides the vertical synchronization signal Vsync and the second frame frequency synchronization signal Hsync_f to the touch driver 400 and the touch driver 400 applies a second touch driving signal Tx2*b* to the touch unit TSU during a display noise section 730*b*, and accordingly a description thereof will be omitted to avoid redundancy.

Also, in the embodiment, the frame frequency synchronization signal Hsync_f may be generated by setting a high section of the porch section 710*b* to the duty value 720*b*, and may be provided to the touch driver 400, and the touch driver 400 may receive the above-described signals and generate the touch driving signals TX in order to avoid the display noise according to a period in which the gate signals and the data signals are transmitted.

For example, even though the frame frequency at which the display driver 200 controls the display panel 100 varies, an influence of the display noise section 730*b* on the touch driving signals TX acting from the display panel 100 may be minimized, and the touch controller 410 may accurately recognize a user's touch input. In addition, distortion of the touch driving signals TX due to the data signals may be decreased, and distortion of an image quality may be minimized while maintaining reliability of touch sensitivity.

Figure 17:
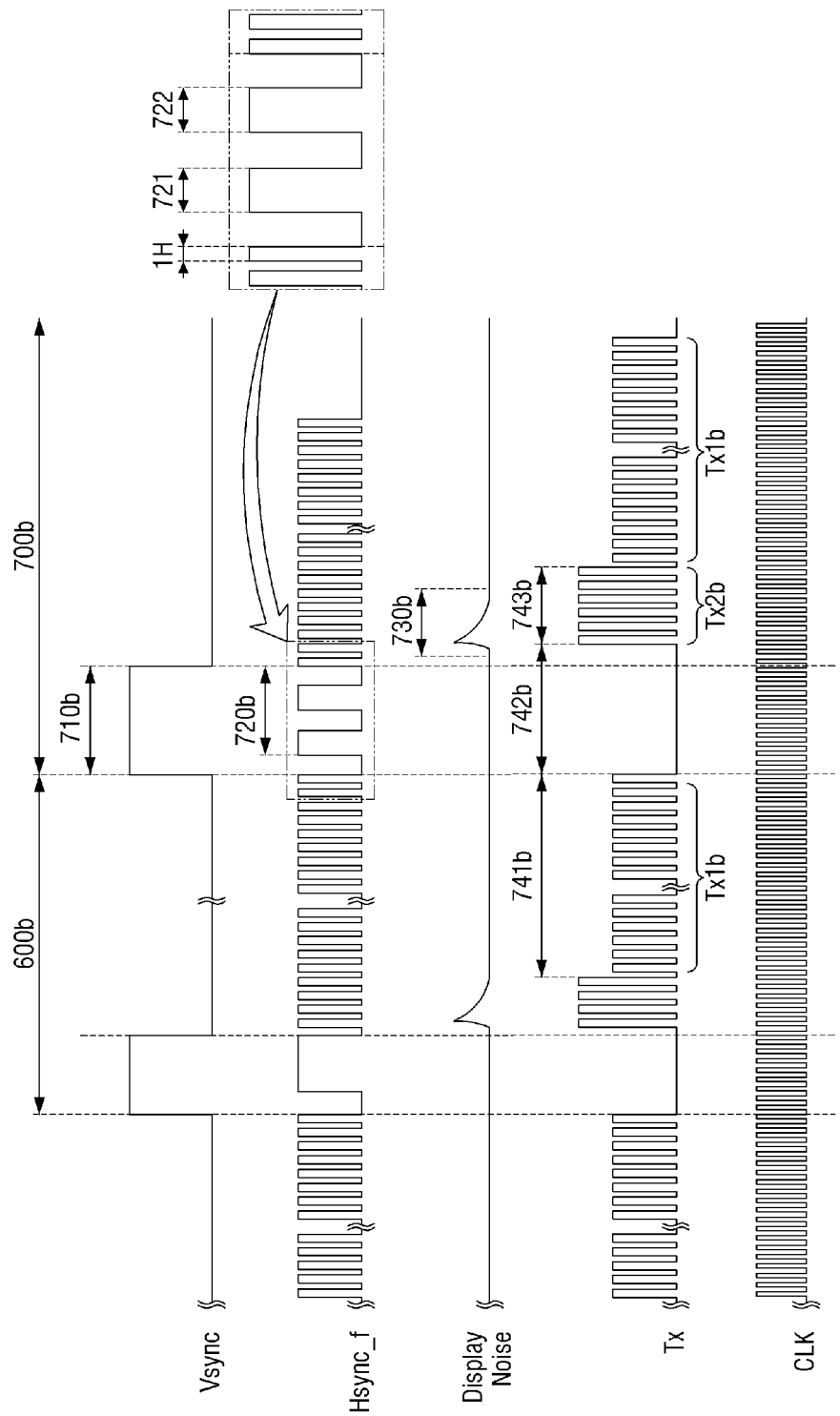
FIG. 17 is a timing diagram that illustrates a method of driving a display driver according to still another embodiment.

FIG. 17 is a timing diagram that illustrates a method of driving a display driver according to still another embodiment.

A method of driving a display driver illustrated in FIG. 17 is substantially similar to the method of driving the display driver illustrated in FIG. 13 except that a duty value 720*b* of a porch section 710*b* is different from the duty value 720*a* of the porch section 710*a*, and an overlapping description thereof will be omitted to avoid redundancy.

Referring to FIG. 17, a first touch driving signal Tx1*b* may be applied to the touch unit TSU in a section in which a frame frequency of a screen to be displayed on the display panel 100 is a second frame frequency 700*b*. The first touch driving signal Tx1*b* may be based on a section in which the vertical synchronization signal Vsync and the second frame frequency synchronization signal Hsync_f are applied, e.g. the section which the frame frequency of the screen to be displayed on the display panel 100 is the second frame frequency 700*b*. When the vertical synchronization signal Vsync and the second frame frequency synchronization signal Hsync_f corresponding to the second frame frequency 700*b* are received from the display driver 200, the touch controller 410 included in the touch driver 400 may apply the first touch driving signal Tx1*b* to the touch unit TSU based on the section in which the synchronization signals are applied.

The duty value 720*b* of the second frame frequency synchronization signal Hsync_f may have at least one high section. For example, the duty value 720*b* may have a first high section 721 and a second high section 722.

When one pulse width of the vertical synchronization signal Hsync is 1H, the width of the first high section 721 and the second high section 722 of the duty value 720*b* may be greater than a pulse width of a plurality of vertical synchronization signals Hsync. For example, each of the first high section 721 and the second high section 722 of the duty value 720*b* may have a pulse width greater than a pulse width of at least 3H to 4H.

In addition, the first high section 721 and the second high section 722 may each have a pulse width at any point in time within the porch section 710*b*. For example, the first high section 721 may have a predetermined high section after a section of 3H to 4H (pulse width of the vertical synchronization signal Hsync) elapses since the porch section 710*b* has started. In addition, the second high section 722 may have a predetermined high section at any point in time in the porch section 710*b*.

However, when one pulse width of the vertical synchronization signal Hsync is 1H, the duty value 720*b* may be greater than a pulse width of a plurality of vertical synchronization signals Hsync. For example, the duty value 720*b* may have a pulse width of at least 3H to 4H.

The duty value 720*b* may be the sum of a plurality of high sections. Accordingly, the second frame frequency synchronization signal Hsync_f having frame frequency information corresponding to the duty value 720*b* corresponding to the sum of the first high section 721 and the second high section 722 stored in the memory 245 may be output.

Accordingly, the second frame frequency synchronization signal Hsync_f having the duty value 720*b* stored in the memory is output based on the vertical synchronization signal Vsync, the horizontal synchronization signal Hsync, and the frame frequency signal Sgn_f received from the display driver 200. Thereafter, similar to the method described with reference to FIG. 13, the display driver 200 provides the vertical synchronization signal Vsync and the second frame frequency synchronization signal Hsync_f to the touch driver 400 and the touch driver 400 applies a second touch driving signal Tx2*b* to the touch unit TSU during a display noise section 730*b*. Accordingly, redundant description thereof will be omitted.

Also in the embodiment, the frame frequency synchronization signal Hsync_f may be generated by setting the duty value 720*b* having the plurality of high sections in the porch section 710*b* and be provided to the touch driver 400, and the touch driver 400 may receive the above-described signals and generate the touch driving signals TX in order to avoid the display noise according to a period in which the gate signals and the data signals are transmitted.

For example, even though the frame frequency at which the display driver 200 controls the display panel 100 varies, an influence of the display noise section 730*b* on the touch driving signals TX acting from the display panel 100 may be minimized, and the touch controller 410 may accurately recognize a user's touch input. In addition, distortion of the touch driving signals TX due to the data signals may be decreased, and distortion of an image quality may be minimized while maintaining reliability of touch sensitivity.

Figure 18:
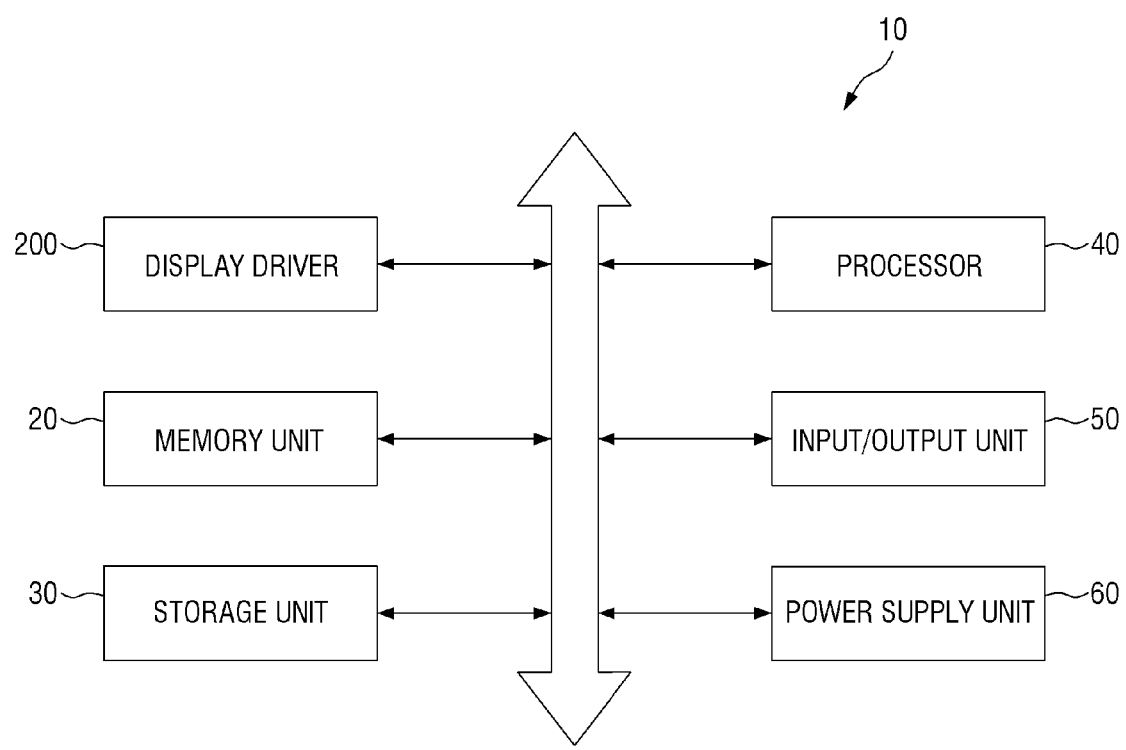
FIG. 18 is a block diagram that illustrates the display device according to an embodiment.

FIG. 18 is a block diagram that illustrates the display device according to an embodiment. Referring to FIG. 18, the display device 10 may include a display driver 200, a memory unit 20, a storage unit 30, a processor 40, an input/output unit 50, and a power supply unit 60.

The memory unit 20 may store data required for operations of the display device 10. For example, the memory unit 20 may store the aforementioned present duty values. For example, the memory unit 20 may include a non-volatile memory device such as an erasable programmable read-only memory (EPROM), an electrically erasable programmable read-only memory (EEPROM), a flash memory, a phase change random access memory (PRAM), and a resistance random access memory (RRAM) or a volatile memory device such as a dynamic random access memory (DRAM) or a static random access memory (SRAM).

The storage unit 30 may include a solid state drive (SSD), a hard disk drive (HDD), a compact disk read-only memory (CD-ROM), and the like.

The processor 40 may perform a specific calculation or task. The processor 40 may be a microprocessor, a central processing unit (CPU), or the like. The processor 40 may be connected to other components through a bus or the like. The input/output unit 50 may include an input means such as a keyboard, a keypad, a touch pad, a touch screen, and a mouse, and an output means such as a speaker and a printer. The power supply unit 60 may supply power required for the operations of the display device 10.

According to embodiments of the present disclosure, by changing a touch driving signal in response to a frame frequency input to a display driver, effects from noise of the display signals interacting with the touch driving signals may be mitigated, touch input reliability may be increased, and touch input sensitivity may be maintained. Further, visual artifacts produced by the display panel may be reduced.

In concluding the detailed description, those skilled in the art will appreciate that many variations and modifications can be made to the embodiments without substantially departing from the principles of the present inventive concept. Therefore, the disclosed embodiments of the inventive concept are used in a generic and descriptive sense only and not for purposes of limitation.

What is claimed is:

1. A display device comprising:
    a display unit;
    a touch unit;
    a display driver configured to drive the display unit and including a synchronization signal generator; and
    a touch driver configured to drive the touch unit and including a synchronization signal receiver, and a touch signal adjuster,
    wherein the synchronization signal generator is configured to generate a vertical synchronization signal supporting a target frequency of a display signal applied to the display unit based on input frame frequency information and a horizontal synchronization signal supporting the target frequency of the display signal and including the frame frequency information based on the frame frequency information and the vertical synchronization signal,
    wherein the horizontal synchronization signal initially includes a first duty value corresponding to an initial frequency different from the target frequency in a first porch section of the vertical synchronization signal, and the synchronization signal generator modifies the horizontal synchronization signal to include a second duty value different from the first duty value that corresponds to the target frequency during a second porch section of the vertical synchronization signal,
    wherein the synchronization signal receiver is configured to extract the second duty value from the horizontal synchronization signal during the second porch section, and transmit the second duty value to the touch signal adjuster, and
    wherein the touch signal adjuster modulates a touch driving signal based on the second duty value.

2. The display device of claim 1,
    wherein the vertical synchronization signal includes a synchronization signal section having a first signal waveform and wherein the porch section has a second signal waveform different from the first signal waveform,
    wherein the horizontal synchronization signal includes a first section corresponding to the synchronization signal section and a second section corresponding to the porch section, and
    wherein the second section includes a third signal waveform different from the first signal waveform and the second signal waveform, and includes the frame frequency information.

3. The display device of claim 2, wherein the second duty value is mapped to the target frequency of the display signal in a lookup table.

4. The display device of claim 3,
    wherein the display driver further includes a memory storing a value of a first pulse width according to the frame frequency information,
    wherein the memory further stores the lookup table, and
    wherein the third signal waveform includes a first pulse that rises at the same time as the start of the porch section, is maintained by the first pulse width, and then falls.

5. The display device of claim 4,
    wherein the first pulse width of the first pulse is 4 to 100 times the width of a pulse width of a unit clock of a clock signal applied to the display driver.

6. The display device of claim 2,
    wherein the synchronization signal generator includes a clock generator configured to receive a clock control signal, to generate the third signal waveform, and to output the clock signal corresponding to a frame frequency.

7. The display device of claim 2,
    wherein the synchronization signal generator includes a clock generator configured to receive a voltage control signal, to generate the third signal waveform, and to output the voltage signal.

8. The display device of claim 1,
    wherein the touch signal adjuster lowers an amplitude of the touch driving signal based on the frame frequency information.

9. The display device of claim 1,
    wherein the synchronization signal receiver is configured to further receive the vertical synchronization signal.

10. The display device of claim 9,
    wherein the display unit and the touch unit are provided in a single panel, and
    wherein the display driver and the touch driver included in a driving chip connected to the single panel.

11. The display device of claim 9,
    wherein the synchronization signal generator includes a first output terminal for outputting the vertical synchronization signal and a second output terminal for outputting the horizontal synchronization signal,
    wherein the touch driver includes a first input terminal and a second input terminal, and
    wherein a first synchronization signal information line connects the first output terminal to the first input terminal, a second synchronization signal information line connects the second output terminal to the second input terminal, and wherein the first synchronization signal information line and the second synchronization signal information line are each disposed between the synchronization signal generator and the touch driver.

12. A display device comprising:

a display unit;

a touch unit disposed to overlap the display unit;

a display driver configured to drive the display unit and including a synchronization signal generator; and a touch driver configured to drive the touch unit and including a synchronization signal receiver and a touch signal adjuster, wherein the synchronization signal generator is configured to generate a vertical synchronization signal supporting a target frequency of a display signal applied to the display unit based on input frame frequency information and a horizontal synchronization signal supporting the target frequency of the display signal and including the frame frequency information, wherein the horizontal synchronization signal is based on the frame frequency information and the vertical synchronization signal, wherein the horizontal synchronization signal initially includes a first duty value corresponding to an initial frequency different from the target frequency in a first porch section of the vertical synchronization signal, and the synchronization signal generator modifies the horizontal synchronization signal to include a second duty value different from the first duty value that corresponds to the target frequency during a second porch section of the vertical synchronization signal, wherein the synchronization signal receiver is configured to extract the second duty value from the horizontal synchronization signal during the second porch section, and transmit the second duty value to the touch signal adjuster, and wherein the touch signal adjuster modulates a touch driving signal based on the second duty value.

13. The display device of claim 12, wherein the vertical synchronization signal includes a synchronization signal section having a first signal waveform and wherein the porch section has a second signal waveform, wherein the horizontal synchronization signal includes a first section corresponding to the synchronization signal section and a second section corresponding to the porch section, and wherein the first section includes the first signal waveform, and the second section includes a third signal waveform different from the first signal waveform and the second signal waveform and includes the first and second duty values, and wherein the second duty value is mapped to the target frequency of the display signal in a lookup table.

14. The display device of claim 13, wherein the third signal waveform includes a first pulse that rises at the same time as the start of the porch section, is maintained by a first pulse width, and then falls.

15. The display device of claim 13, wherein the touch signal adjuster lowers an amplitude of the touch driving signal based on the frame frequency information.

16. The display device of claim 12, wherein the synchronization signal receiver is configured to further receive the vertical synchronization signal.

17. The display device of claim 16, wherein the display unit and the touch unit are provided in a single panel, and wherein the display driver and the touch driver are included in a driving chip connected to the single panel.

18. A display device comprising:

a display unit;

a touch unit;

a display driver configured to drive the display unit and including a synchronization signal generator; and a touch driver configured to drive the touch unit and including a synchronization signal receiver, and a touch signal adjuster, wherein the synchronization signal generator is configured to generate a vertical synchronization signal supporting a frequency of a display signal applied to the display unit based on input frame frequency information and a horizontal synchronization signal supporting the frequency of the display signal and including the frame frequency information based on the frame frequency information and the vertical synchronization signal, and wherein the synchronization signal receiver is configured to determine a porch section of the vertical synchronization signal, extract a duty value from the horizontal synchronization signal during the porch section, and transmit the duty value to the touch signal adjuster, and wherein the touch signal adjuster lowers an amplitude of the touch driving signal based on the frame frequency information.

* * * * *